(12) United States Patent
Wilson

(10) Patent No.: US 6,795,264 B2
(45) Date of Patent: Sep. 21, 2004

(54) LBA TRACKING FOR SYSTEM DATA MANAGEMENT

(75) Inventor: Brian D. Wilson, Louisville, CO (US)

(73) Assignee: Texas Instruments Incorporated, Dallas, TX (US)

( * ) Notice: Subject to any disclaimer, the term of this patent is extended or adjusted under 35 U.S.C. 154(b) by 306 days.

(21) Appl. No.: 10/007,192

(22) Filed: Oct. 25, 2001

(65) Prior Publication Data

US 2003/0081341 A1 May 1, 2003

(51) Int. Cl.[7] .............................................. G11B 15/18
(52) U.S. Cl. ..................................................... 360/69
(58) Field of Search .............................. 360/69, 31, 66, 360/49; 711/156, 205, 206, 207, 208, 209, 4, 137, 162, 167, 112; 710/52, 53

(56) References Cited

U.S. PATENT DOCUMENTS

| | | | |
|---|---|---|---|
| 4,414,644 A | * | 11/1983 | Tayler .......................... 711/162 |
| 4,458,316 A | * | 7/1984 | Fry et al. ....................... 710/52 |
| 4,584,617 A | * | 4/1986 | Libove et al. ................. 360/49 |
| 4,864,532 A | * | 9/1989 | Reeve et al. ................... 710/53 |
| 4,905,184 A | * | 2/1990 | Giridhar et al. ............... 710/52 |
| 5,062,044 A | * | 10/1991 | Asami et al. ................. 710/110 |
| 5,220,569 A | * | 6/1993 | Hartness ....................... 714/758 |
| 5,596,458 A | | 1/1997 | Emo et al. |
| 5,665,952 A | | 9/1997 | Ziarno |
| 5,696,775 A | * | 12/1997 | Nemazie et al. ............. 714/805 |
| 5,729,718 A | * | 3/1998 | Au ............................... 711/167 |
| 5,794,219 A | | 8/1998 | Brown |
| 5,835,896 A | | 11/1998 | Fisher et al. |
| 5,870,237 A | | 2/1999 | Emo et al. |
| 5,890,138 A | | 3/1999 | Godin et al. |
| 5,905,975 A | | 5/1999 | Ausubel |
| 6,005,725 A | | 12/1999 | Emo et al. |
| 6,021,398 A | | 2/2000 | Ausubel |
| 6,023,686 A | | 2/2000 | Brown |
| 6,044,363 A | | 3/2000 | Mori et al. |
| 6,061,195 A | | 5/2000 | Wilson et al. |
| 6,091,559 A | | 7/2000 | Emo et al. |
| 6,092,145 A | * | 7/2000 | Kigami et al. .................. 711/4 |
| 6,131,138 A | * | 10/2000 | Packer et al. ................... 711/4 |
| 6,151,589 A | | 11/2000 | Aggarwal et al. |
| 6,256,685 B1 | * | 7/2001 | Lott ............................. 710/52 |
| 6,260,257 B1 | | 7/2001 | Emo et al. |
| 6,463,509 B1 | * | 10/2002 | Teoman et al. ............. 711/137 |
| 6,499,083 B1 | * | 12/2002 | Hamlin ....................... 711/112 |
| 6,512,647 B1 | * | 1/2003 | Quak et al. ................... 360/66 |
| 6,650,492 B2 | * | 11/2003 | Lenny et al. ................. 360/31 |

* cited by examiner

Primary Examiner—David Hudspeth
Assistant Examiner—Fred F. Tzeng
(74) Attorney, Agent, or Firm—W. Daniel Swayze, Jr.; W. James Brady; Frederick J. Telecky, Jr.

(57) ABSTRACT

Systems and methodologies are disclosed for interfacing a storage medium with a host using a segmented buffer. Data blocks are transferred between the host and medium according to logical block addresses, with buffer segment pointers indicating the logical block addresses of data blocks in the buffer. Buffer management hardware or firmware compares the pointer values directly with logical block addresses from host commands in order to determine whether desired data blocks are within the buffer.

33 Claims, 16 Drawing Sheets

FIG. 10
SEGMENT DESCRIPTOR TABLE 200
| SEGMENT 270 | R/W 272 | BASE 274 | SIZE 275 | INITIAL LBA | HOST LBA 276 | DISK LBA 277 | ALLOWED LBA 278 |
|---|---|---|---|---|---|---|---|
| 0 | R | 0 | 100 | 13000 | 130020 | 130090 | 130100 |
| 1 | W | 100 | 100 | 2030 | 2130 | 2087 | 2130 |
| 2 | W | 200 | 50 | 130070 | 130108 | 130120 | 130120 |
| ⋮ | ⋮ | ⋮ | ⋮ | ⋮ | ⋮ | ⋮ | ⋮ |
| J | R | 900 | 50 | 130070 | 130108 | 130120 | 130120 |
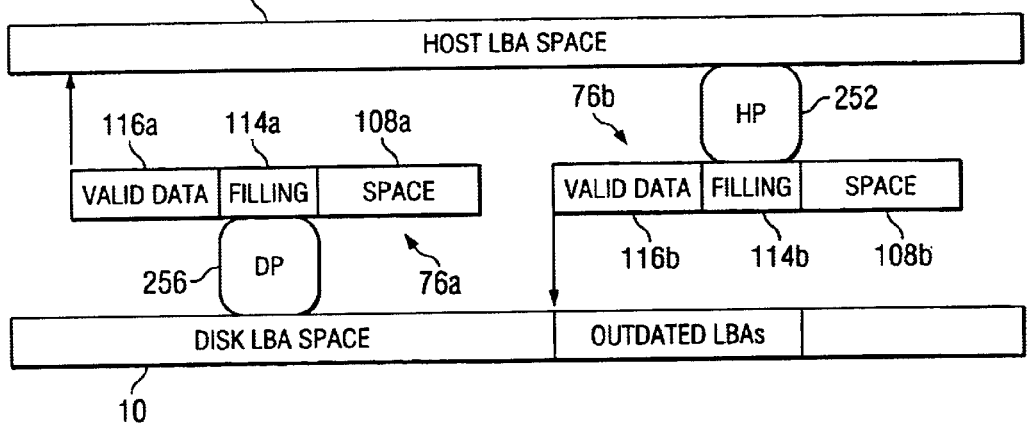
FIG. 11a
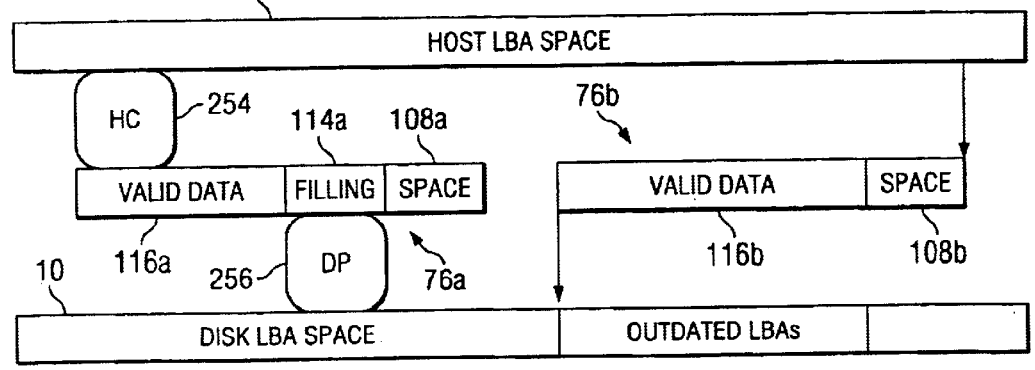
FIG. 11b

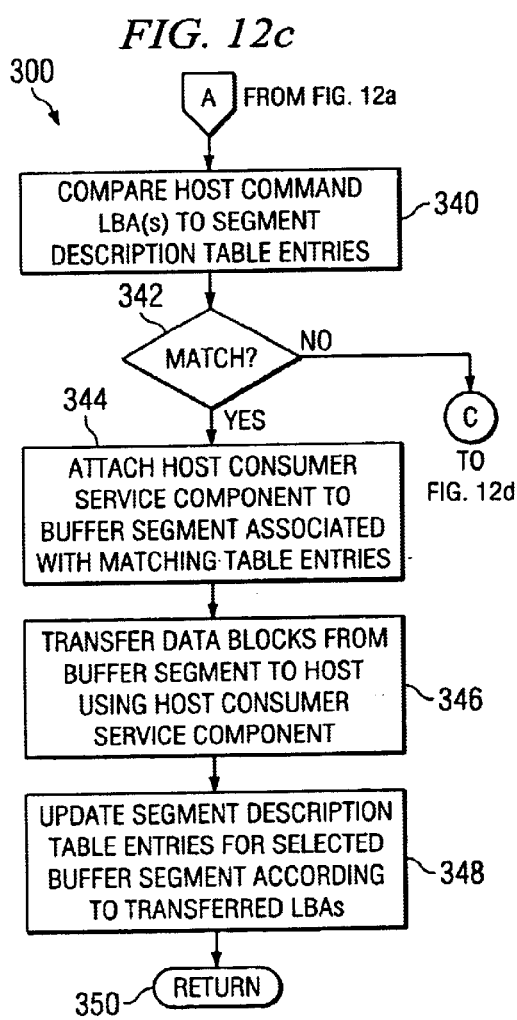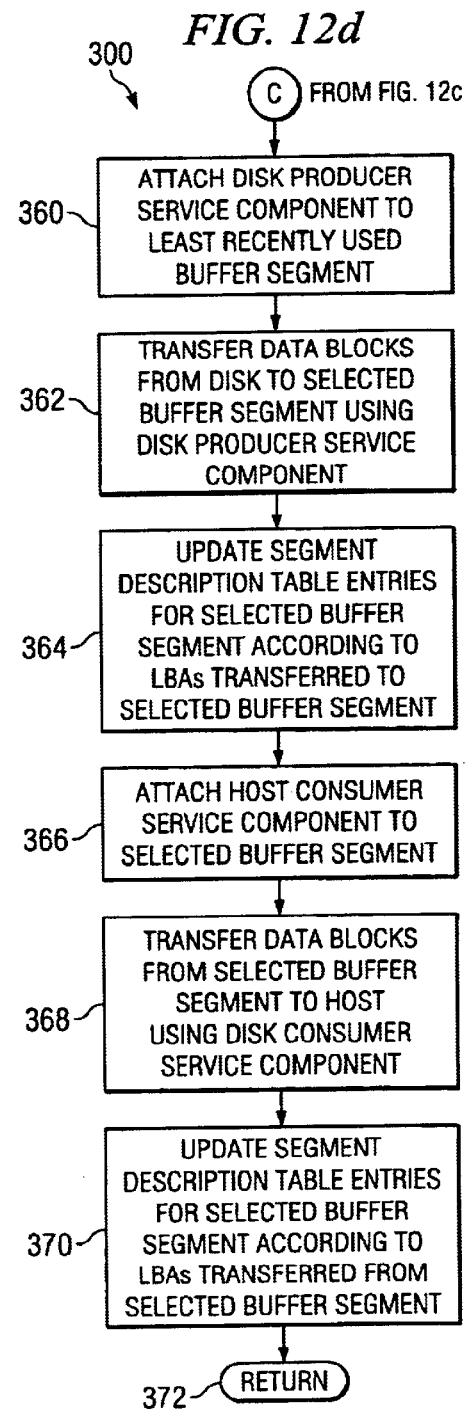

LBA TRACKING FOR SYSTEM DATA MANAGEMENT

FIELD OF INVENTION

The present invention relates generally to the art of peripheral storage devices and, more particularly, to buffer management systems and methodologies for peripheral storage devices.

BACKGROUND OF THE INVENTION

Hard disk drives and other peripheral storage devices are standard features in most computer systems. Such devices provide mass storage functionality for a host computer, and may include hard disk drives, CDROM drives, tape drives, optical disk memory devices, floppy disk drives, and the like. Hard disk drives, for example, typically include one or more magnetically coated platters used for storing program instructions, data, and other information used by the computer system. One or more such platters may be configured in a stack, which is rotated by a spindle or servo motor. A space is provided between each platter to allow an arm having a read/write head to be positioned on each side of each platter such that information may be stored and retrieved. Information may be stored on one or both sides of the platters, which are generally organized into sectors, tracks, zones, and cylinders. The read/write heads are mounted onto one or more suspension arms whereby each of the read/write heads may be positioned as desired. The suspension arms are coupled together at a voice coil motor (VCM) to form one positionable unit or assembly. The VCM positions the suspension arms so that an active read/write head is properly positioned for reading or writing information. The read/write heads may thus be positioned between an inner diameter and an outer diameter of the platters in a controlled fashion to access data stored thereon.

Hard disk drives and other types of peripheral storage devices also include a variety of electronic control circuitry for processing data and for controlling its overall operation, including a hard disk controller. Typical controllers include a processor, a pre-amplifier, a read channel, a write channel, a servo controller, a motor control circuit, a read-only memory (ROM), a random-access memory (RAM), and a variety of disk control circuitry to control the operation of the hard disk drive and to properly interface the hard disk drive to a bus in a host computer system. The disk control circuitry generally includes a processor (e.g., a DSP, microprocessor, microcontroller, or the like) for executing instructions stored in memory to control the operation and interface of the hard disk drive.

Hard disk drives and other peripheral storage devices perform write, read, and servo operations when storing and retrieving data. Generally, a write operation includes receiving data from a system bus and storing the data on the platters. In a read operation, the appropriate sector to be read is located and data that has been previously written to one or more platters is read. The data is then provided to the host computer system. Modern peripheral storage devices include some form of buffer memory, usually segmented, to buffer or temporarily store information on its way from the host system to the storage media (platters) and/or on its way from the media to the host system. In addition, the control circuitry may include instruction memory (e.g., ROM, EEPROM, FLASH, and the like) used for storing firmware instructions for execution by the controller processor, and execution memory (e.g., SRAM) used for storing temporary variables, intermediate results, and the like (scratchpad).

Conventional hard disk drives and other peripheral storage devices typically perform many of the data transfer functions via a DSP or other processor executing firmware instructions. Such transfer functions include management of the buffer memory so as to facilitate transfer of data between the host and the storage medium. In this regard, the primary purpose of the buffer memory is for temporary storage of information in transit to or from the platters, and buffer management is directed toward presenting the storage medium (e.g., hard disk, CD-ROM, tape or the like) as an extension of the host's memory space. Thus, an overall goal of peripheral storage devices generally, and the management of the buffer memory therein, is to provide storage and retrieval of data in a timely fashion, so as to minimize access times from the perspective of the host system.

Toward that end, conventional peripheral mass storage devices have heretofore provided counters associated with the various components thereof to track the status and contents of the medium, the buffer memory, and the data therein. Firmware is used to manage the buffer operation and segmentation thereof, wherein the counter values are read and interpreted by firmware in order to ascertain the current status of the buffer segments. However, the various counters associated with the formatter, disk and host FIFOs, and the buffer segments are unrelated to one another. Thus, the firmware in conventional peripheral storage devices must reconcile the various counter values in order to make a determination as to whether a particular data block is within the buffer.

When the storage device receives a host command from the host computer system, either requesting a read of certain blocks of data from the medium, or asking that certain blocks be written thereto, the buffer manager firmware must scrutinize the counters to determine whether the data blocks of interest already reside in one or more buffer segments. If so, the firmware initiates the appropriate buffer component operations so as to effect the desired transfer. Otherwise, buffer segments are operated to receive the data blocks from one of the medium and the host, and to provide the blocks to the other of the medium and the host, depending upon whether a read or a write operation is to be performed. Accesses by the buffer system to the storage medium are conventionally handled with respect to sectors, tracks, zones, and cylinders, whereas host transfers are not.

Current buffer systems include separate counters for tracking storage medium and host data transfers, wherein the counter values for the disk and the counters related to host transfers are not directly comparable. In order to intelligently determine whether the data blocks needed for a particular transfer are available in the buffer, the firmware is required to read all the counter values and reconcile many different counts of how many blocks are in various buffer segments with the blocks of interest according to the host commands being processed. Thus, in present disk drives and other storage devices, the firmware has to manipulate all these values and do rudimentary additions, subtractions, and comparisons. Such low level tasks are very firmware intensive and occupy processing resources which could otherwise be utilized for higher level functions in managing the storage device. Consequently, there is a need for improved peripheral storage device apparatus and methodologies for tracking and managing buffer contents.

SUMMARY OF THE INVENTION

The following presents a simplified summary in order to provide a basic understanding of some aspects of the invention. This summary is not an extensive overview of the invention. It is intended neither to identify key or critical elements of the invention nor to delineate the scope of the invention. Rather, the primary purpose of this summary is to present some concepts of the invention in a simplified form as a prelude to the more detailed description that is presented later.

The invention relates to systems and methods for interfacing a storage medium, such as a disk, CD-ROM, TAPE, or the like, with a host system using a segmented buffer, and for tracking the data flow therein, by which the above mentioned and other difficulties or shortcomings associated with prior storage devices can be mitigated or overcome. The invention provides for tracking buffer contents and data transfers associated therewith according to logical block addresses (LBAs), whereby the contents of the buffer segments can be directly compared with LBAs from a host request (read or write), so as to reduce the firmware intervention in determining whether and when transfers to or from the buffer need to be made. In this regard, logical block addresses are addresses corresponding with data blocks according to the host system memory space, without regard to the sector, track, and/or disk location at which such data blocks may be stored in a disk or other mass storage medium. Whereas prior storage device buffer systems tracked data blocks according to sector, track, and other location nomenclatures relative to the storage medium, the present invention uses LBAs throughout the buffer system. Thus, the invention allows hardware to be utilized in performing low level comparisons, without the need for firmware and associated processing resources to reconcile unrelated counter values, as was found in prior devices.

One aspect of the present invention provides a method of interfacing a storage medium with a host using a segmented buffer to transfer data blocks between the host and the storage medium. The method comprises transferring one or more data blocks from one of the host and the storage medium to a first buffer segment according to a logical block address, and transferring the block(s) from the buffer segment to the other one of the host and the storage medium according to the logical block address. Logical block address indications or pointers can be provided in the buffer system, such as in an array or a segment descriptor table, wherein the logical block address indications are indicative of data block contents of the plurality of buffer segments. The method may further comprise receiving a command from the host, having one or more command logical block address indications associated with a desired data block transfer, and performing a comparison of the command logical block address indications with the logical block address indications in the segment descriptor table. Based on the comparison, a buffer segment is selected for the desired data block transfer.

The invention thus allows direct comparison of logical block addresses (LBAs) associated with the buffer segments and the host command, which can advantageously be performed in hardware, rather than forcing buffer management firmware to reconcile unrelated counter values from various buffer components, as was done in prior mass storage devices. Moreover, the firmware computational resources can be employed in performing other tasks, thus drammatically reducing the complexity, size and cost of the overall system. Moreover, the status of the contents of the buffer is current in real time, and immediately available to both hardware and firmware components of the system. Thus, when a host command is received, a hardware or firmware management component can take the host command and immediately go through the LBAs in the segment descriptor table and determine what blocks exist in each buffer segment. Based on the comparison, the requested blocks may then be transferred immediately in hardware, without requiring firmware intervention, resulting in a dramatic increase in performance, a reduction in firmware complexity, and a reduction in the overall system size and complexity, cost, and development time.

Another aspect of the invention provides peripheral storage device buffer systems for interfacing a host with a storage medium, comprising a buffer memory with a plurality of buffer segments operative to store retrieved data blocks and a host service component operatively associated with the buffer memory and the host to transfer data blocks therebetween according to logical block addresses. In addition, a storage medium service component is operatively associated with the buffer memory and the storage medium to transfer data blocks therebetween according to logical block addresses. The buffer memory may comprise a buffer manager component receiving host commands having one or more logical block addresses associated with a desired data block transfer.

The buffer system may further comprise a segment description table or array having logical block address indications which represent logical block addresses of data blocks in the buffer segments. For example, entries may be provided in the segment description table indicating whether each segment was last used for a read or write operation, as well as an initial LBA indication, a host LBA indication, and a disk LBA indication for each of the buffer segments. The initial LBA indication may be indicative of a logical block address associated with a first data block in the corresponding buffer segment, and the read/write indication, the host LBA indication, and the disk LBA indication are indicative of the data blocks in the corresponding buffer segment.

To the accomplishment of the foregoing and related ends, the following description and annexed drawings set forth in detail certain illustrative aspects and implementations of the invention. These are indicative of but a few of the various ways in which the principles of the invention may be employed. Other aspects, advantages and novel features of the invention will become apparent from the following detailed description of the invention when considered in conjunction with the drawings.

BRIEF DESCRIPTION OF THE DRAWINGS

FIG. 10 is a schematic diagram illustrating an exemplary segment descriptor table in accordance with the present invention;

FIGS. 11a–11h are schematic diagrams illustrating further details of the exemplary disk and host components utilizing an allowed LBA indication in accordance with the present invention; and FIGS. 12a–12d are flow diagrams illustrating an exemplary methodology in accordance with another aspect of the invention.

DETAILED DESCRIPTION OF THE INVENTION

Figure 1:
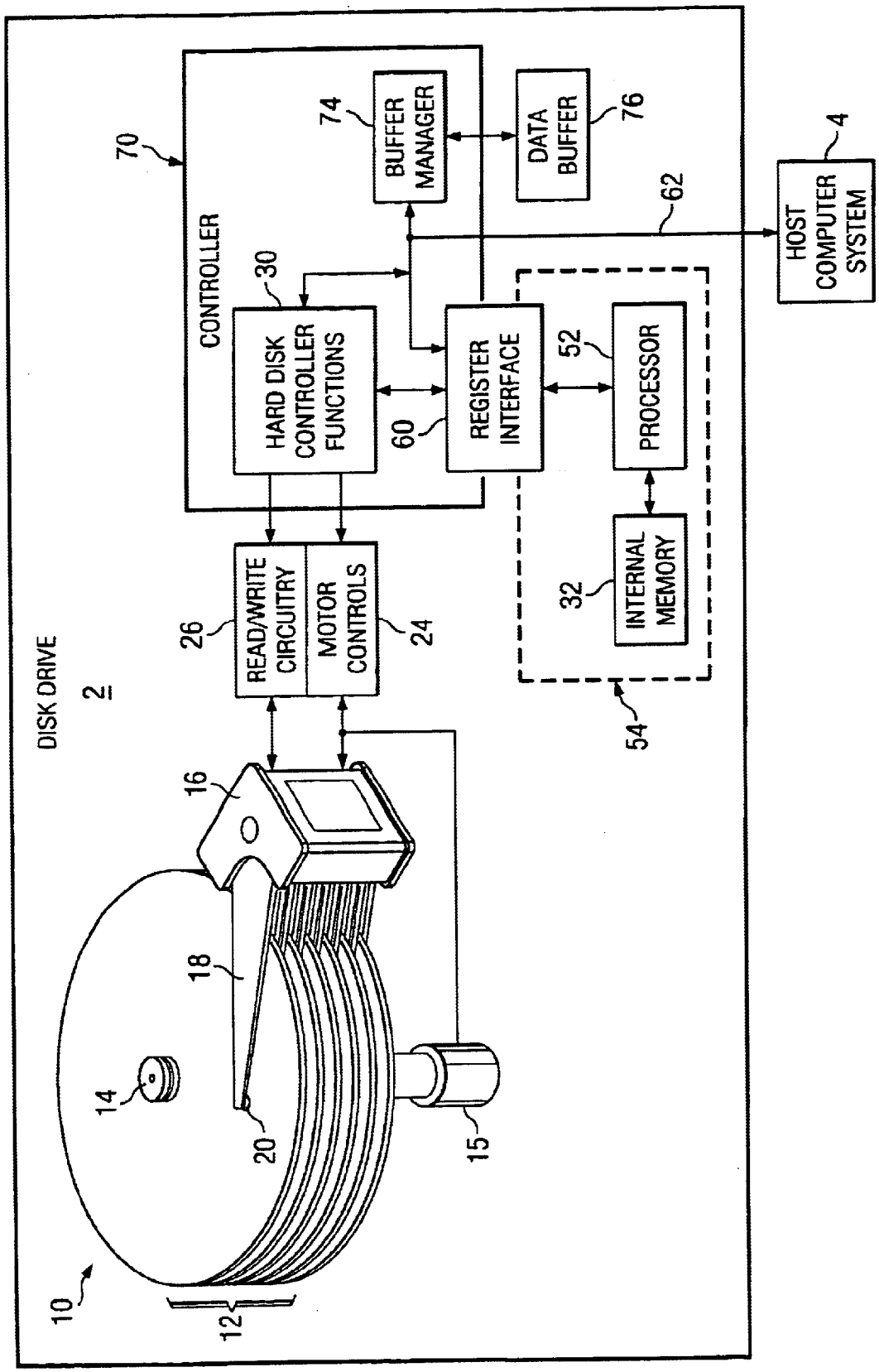
FIG. 1 is a schematic illustration of an exemplary peripheral storage device system in which one or more aspects of the present invention may be employed.

The present invention will now be described with reference to the attached drawings, wherein like reference numerals are used to refer to like elements throughout. The invention relates to methods and systems for operating and tracking a buffer in a peripheral storage device so as to transfer data blocks between a host system and a storage medium, such as a hard disk. Although illustrated and described hereinafter in association with a hard disk drive, the invention finds utility in many different mass storage devices, including but not limited to hard disk drives, CDROM drives, tape drives, optical disk memory devices, floppy disk drives, and the like.

Figure 2:
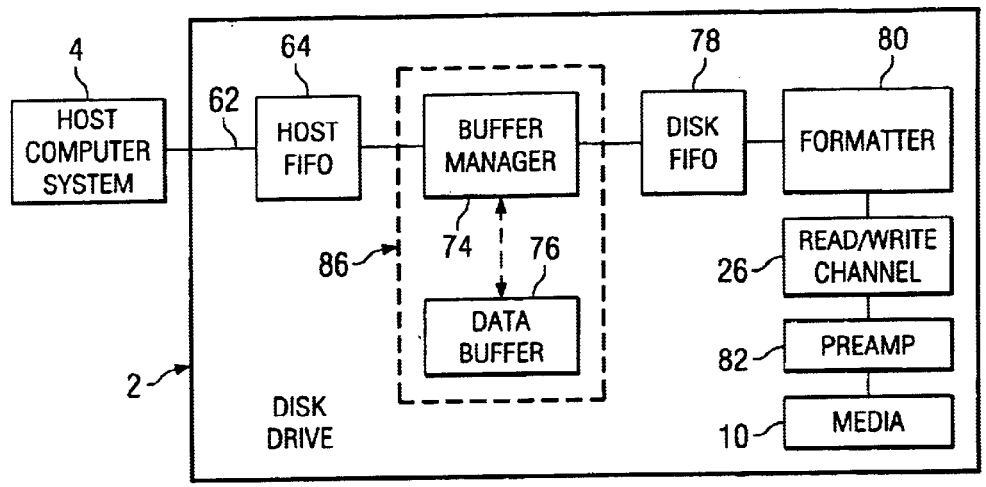
FIG. 2 is a schematic diagram illustrating further details of the exemplary storage device of FIG. 1.

In order to provide context for the invention, FIGS. 1 and 2 illustrate an exemplary disk drive system 2 adapted to provide mass storage for a host computer system 4. The storage system 2 comprises a disk drive storage medium 10 having a stack of magnetically coated platters 12 used for storing information. The platters 12 are mounted together in a stacked position for rotation about a platter spindle 14 via a spindle or servo motor 15. A space is provided between each platter to allow an arm 18 having a read/write head 20 associated therewith, to be positioned on each side of each platter 12 so that information may be stored and retrieved. Information is stored on each side of each platter 12 and is generally organized into sectors, tracks, zones, and cylinders (not shown).

The read/write heads 20 are mounted to one end of dedicated suspension arms 18 whereby the read/write heads 20 may be positioned in a controlled fashion. The opposite ends of the suspension arms 18 are coupled together at a voice coil motor 16 (VCM) to form one unit or assembly that is positionable by the VCM 16. The VCM 16 controllably positions the suspension arms 18 whereby an active read/write head 20 is positioned for reading or writing information. The drive 10 also comprises electronic motor control and read/write circuitry 24 and 26, respectively, as well as a controller 70, for processing data and for performing hard disk control functions 30. The motor control circuitry 24 provides for controlled movement of the read/write heads 20 using suspension arms 18 and the VCM 16, as well as for rotational movement of the platters 12 about the spindle 14 using the spindle motor 15.

The read/write circuitry 26 provides for controlling the electrical read and write operations of the read/write heads 20, and for transporting data to and from the read/write heads 20. The motor control circuitry 24 and the read/write circuitry 26 are operatively associated with the hard disk controller functions 30, which interface with a processor 52 via a register interface 60 in a processor sub-system 54. The processor 52 may comprise, for example, a microcontroller, microprocessor, digital signal processor (DSP), or other type of processor, which is adapted to perform one or more tasks according to firmware (e.g., program instructions), stored in an internal memory system 32. The internal memory 32 may further be adapted for storage of temporary variable data and other information associated with the execution of a firmware program in the processor 52, whereby a portion of the memory 32 may be employed as a processor scratchpad memory. The processor sub-system 54 may further be integrated within the controller 70.

The controller 70 may be programmed by the processor 52, for example, via one or more control registers (not shown) through the register interface 60, to operate the motor controls 24 and the read/write circuitry 26, as well as to interface with the host computer system 4 and to perform other hard disk controller functions 30. The processor 52 may be adapted to execute program instructions from the memory 32 to perform various tasks associated with the operation of the disk drive 2, wherein such program instructions are created according to programming techniques as are known.

The controller 70 also comprises a buffer system 86 with a buffer manager component 74, which is operable to interface the controller 70 with a data buffer memory device 76. The buffer 76 is used for temporary storage of data blocks being transferred between the host computer system 4 and the disk drive 10, for example, in association with read and/or write command messages from the host computer system 4. The buffer manager component 74 may be implemented in hardware, firmware, or combinations thereof according to the various aspects of the present invention. For instance, some of the functions of the buffer manager 74 may be implemented using the processor 52 according to firmware instructions stored in the memory 32, whereas others may be performed in dedicated hardware components. As illustrated in FIG. 2, for example, data from the host system 4 is transferred to a host first-in, first-out (FIFO) memory 64 via a host bus 62. The exemplary host FIFO 64 is a two word device for speed-matching data transferred between the bus and the buffer system 86 comprising the segmented buffer 76 and the buffer manager 74, although any size FIFO may be employed as the host FIFO 64.

The exemplary buffer memory 76 comprises 64 Mbytes of random access memory (RAM) organized as 32 Mwords, although other buffer sizes and configurations are contemplated within the scope of the present invention. The buffer memory 76 may be partitioned or segmented into individual buffer segments (not shown) for use in managing data blocks being transferred. This segmentation may also be programmable, wherein the size and location of the various buffer segments in the buffer 76 are adjustable according to usage, for example, where the buffer manager 74 (e.g., hardware or firmware) may dynamically reprogram buffer segmentation as needed to efficiently manage data transfers. The buffer segments in the buffer 76 may be individually thought of as circular memory segments, although the physical arrangement of the memory 76 and the segments thereof may be a typical sequential memory architecture. In this regard, the circular "wrap-around" features of the individual buffer segments, as well as the size and location thereof in the memory 76 may be implemented using hardware and/or firmware in the buffer manager 74. The buffer 76 also interfaces with the storage media 10 via a disk FIFO memory 78, a formatter 80, the read/write channel circuitry 26, and a preamp 82.

The present invention involves movement or transfer of data blocks between the host 4 and the disk medium 10, where the data block transfers are performed and tracked according to logical block addresses (LBAs). Whereas prior storage devices performed and tracked such data flow using localized counters associated with various buffer and buffer manager components (e.g., FIFO counters, etc), the present invention provides for tracking data blocks in terms of LBAs, wherein pointers or register values are maintained, such as in a table, which are indicative of the LBAs of data blocks at the various locations within the buffer system 86.

Referring now to FIGS. 3a–3h, one segment 76a of the buffer memory 76 is illustrated as situated between a producer LBA space 100 and a consumer LBA space 102, wherein one of the host system 4 and the disk media 10 is the consumer LBA space 102 and the other is the producer space 100. For instance, during a disk read operation, the producer LBA space 100 represents the disk media 10 providing or "producing" one or more data blocks to the buffer segment 76a, with the consumer LBA space 102 representing the host system 4, which receives or "consumes" data blocks from the segment 76a. In a write operation, the roles are reversed, wherein the producer LBA space 100 represents the host 4 providing one or more data blocks to the buffer segment 76a, with the consumer LBA space 102 representing the disk media 10 consuming data blocks from the segment 76a. The exemplary buffer segment 76a may be any number of blocks or sectors in length, such as 512 blocks, and may begin at any address within the segmented buffer memory 76.

Figure 3A:
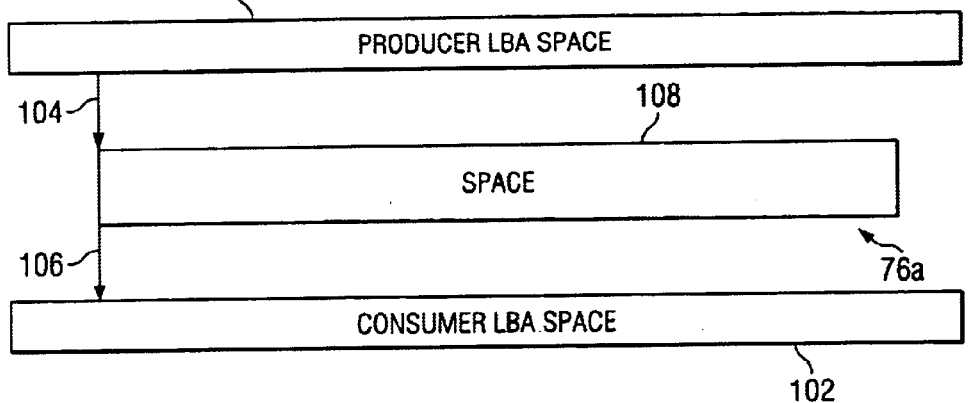
FIGS. 3a–3h are schematic diagrams illustrating operation of exemplary producer and consumer components in association with a buffer segment in accordance with the present invention.
Figure 3B:
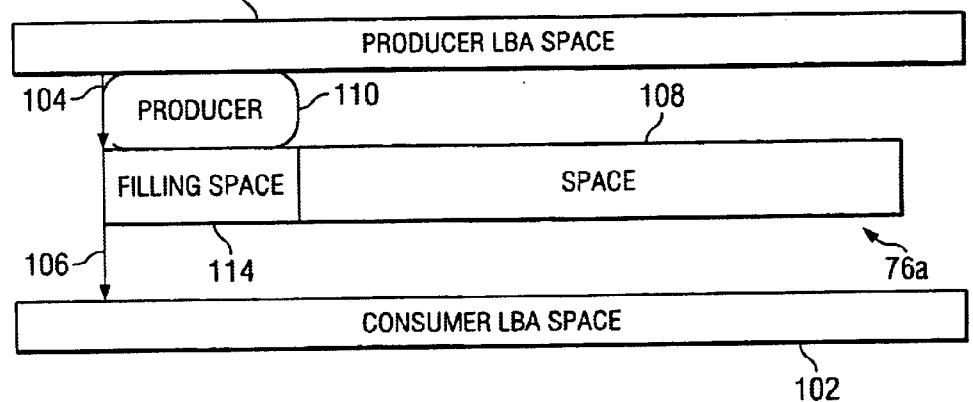
Figure 3C:
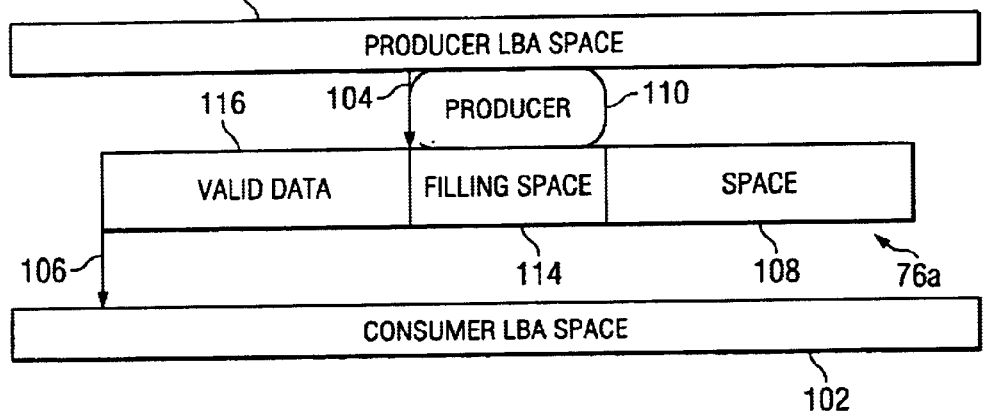

Prior to usage of the buffer segment 76a, for example at an initialization stage, the producer and consumer pointers or LBA indications 104 and 106, respectively, point to or represent the initial LBA of the segment 76a, as indicated in FIG. 3a. The buffer segment 76a at this point is assumed to contain no data usable by the host 4 or the disk 10, and is thus indicated as including space 108. Thereafter, as illustrated in FIG. 3b, a producer 110 is associated with the segment 76a, for example, in response to a disk read command from the host 4, wherein the producer 110 begins filling the segment 76a with data from the producer LBA space 100 (e.g., in this case, from the disk medium 10). During this time, a portion 114 of the segment 76a which has been initially filled with producer data is identified as "filling space". While the producer is transferring data to the buffer segment 76a, the producer LBA indicator or pointer 104 remains at the initial LBA for the segment 76a until the produced data 114 is determined to be free of errors (e.g., qualified). As indicated in FIG. 3c, the producer 110 continues providing disk data from the producer LBA space 100 in this fashion until one or more blocks 116 of transferred data are determined to be valid, where the pointer 104 is positioned to indicate the end of the valid data 116.

Figure 3D:
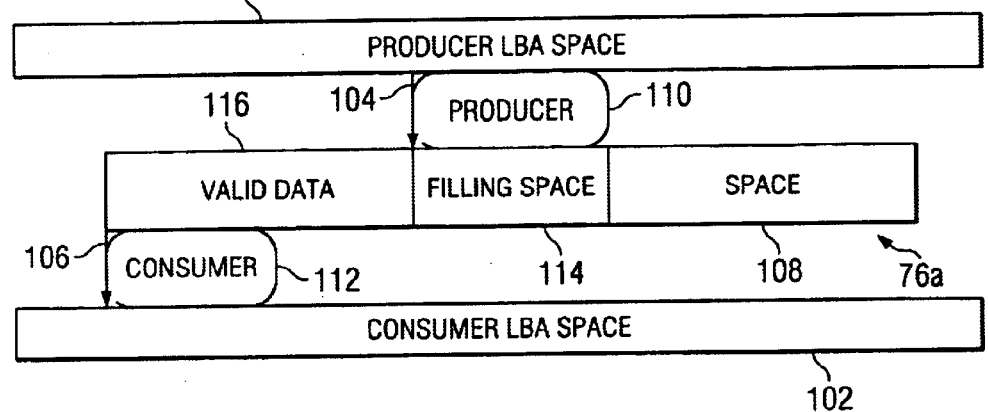
Figure 3E:
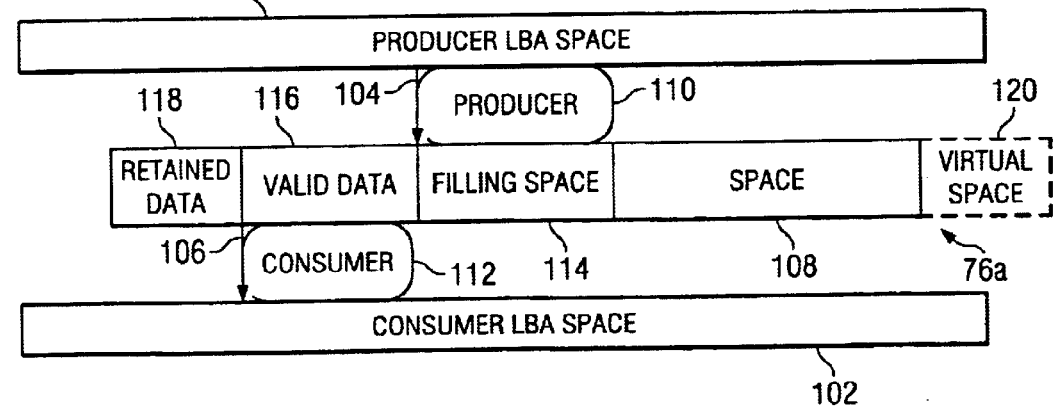
Figure 3F:
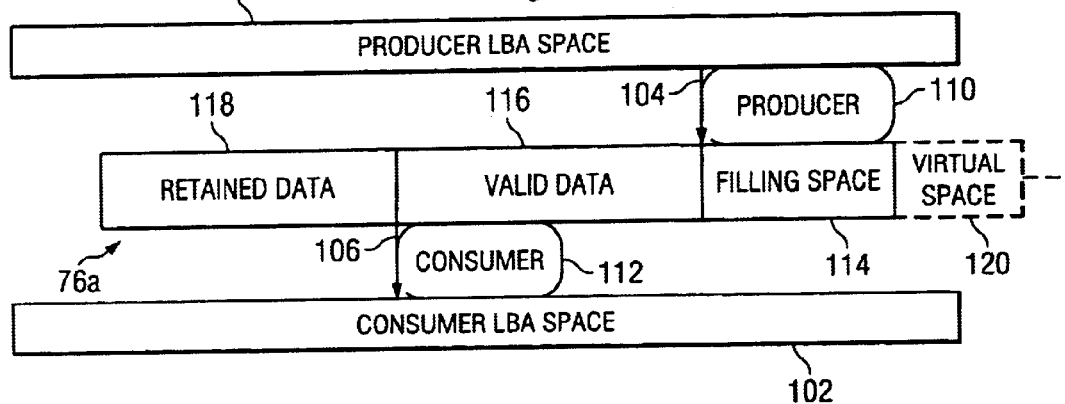

In FIG. 3d, once valid data 116 is present in the buffer segment 76a, a consumer 112 is associated with the segment 76a, for example, in order to further service the disk read command from the host 4. As illustrated in FIG. 3e, the consumer 112 proceeds to consume or transfer data from the buffer segment 76a to the consumer LBA space 102 (e.g., to the host 4), and the pointer 106 reflects the progress of the consumer 112 having a value indicative of the most recently transferred data block LBA. Once one or more data blocks have been properly transferred to the consumer LBA space 102, the transferred data remains in the buffer segment 76a in the form of retained data 118, which may be used to service subsequent transfer commands, or which may be subsequently reused to store new data. As the buffer segment 76a is operated as a circular memory segment, the retained data space 118 can be represented as virtual space 120, wherein the virtual space 120 comprises the actual physical memory of the retained data 118 in the buffer segment 76a. In this regard, the virtual space 120 remains available for use by the components 110, 112 if needed, but until actually used, the retained data 118 remains in the segment 76a. As the producer continues, as shown in FIG. 3f, the space 108 is completely consumed, with the segment 76a comprising retained data 118, valid data 116 from which the consumer 112 may consume data blocks, and filling space 114 being operated on by the producer 110.

Figure 3G:
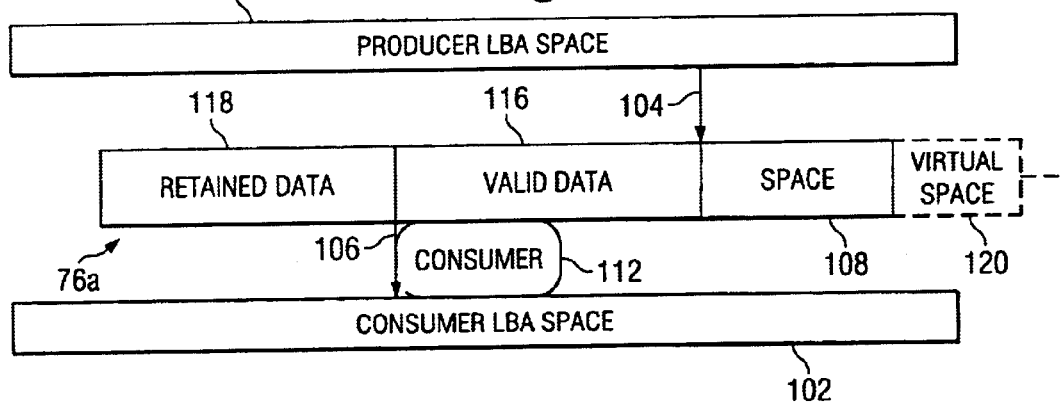
Figure 3H:
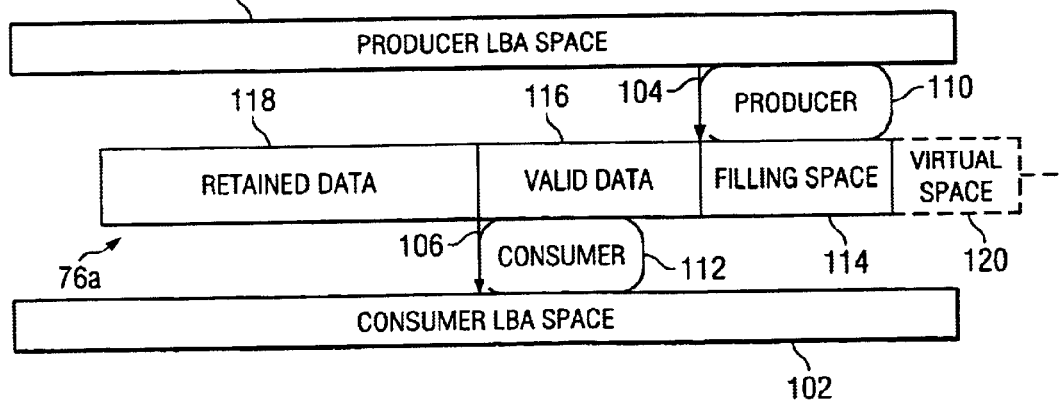

Thereafter, as illustrated in FIG. 3g, the producer 110 may be disassociated from the illustrated buffer segment 76a, for example, when the desired amount of data has been transferred from the producer LBA space 100 to the segment 76a, or in order to service another host command using another buffer segment (not shown). The pointer 104 indicates the last valid data block transferred by the producer 110, such that if further disk read commands request further LBAs related to the data already buffered (e.g., as is common), the producer 110 can again be associated with the buffer segment 76a to transfer further blocks to the segment 76a, as illustrated in FIG. 3h. In this regard, the producer 110 resumes transferring data blocks from the producer LBA space (e.g., the disk media 10) to the segment 76a at the point where it left off, as indicated by the pointer 104.

Figure 4:
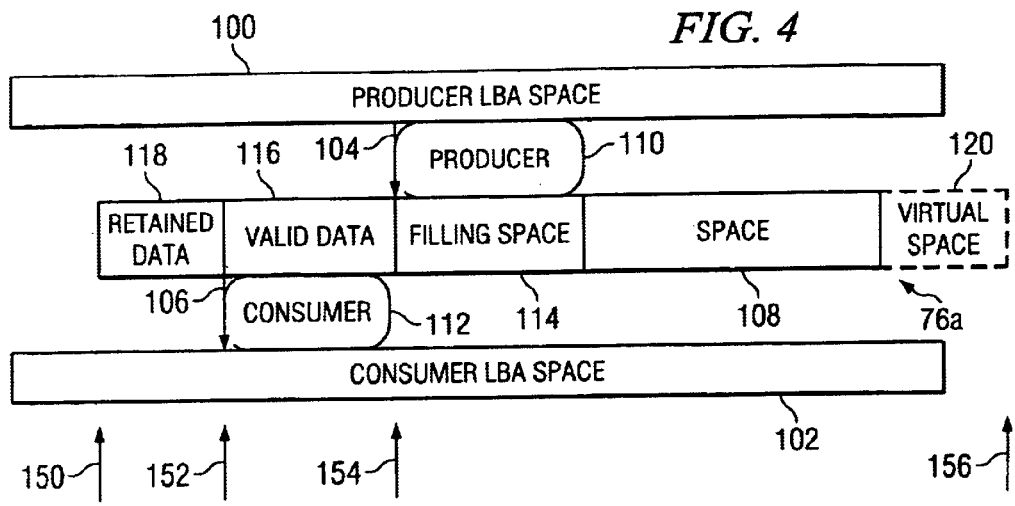
FIG. 4 is a schematic diagram illustrating an exemplary buffer segment and logical block address indications or pointers associated therewith according to the invention.

Referring now to FIG. 4, the invention advantageously provides transfer to and from the individual buffer segments (e.g., segment 76a and others) in the segmented buffer 76 (FIGS. 1 and 2) using consumer or producer services (e.g., services 112 and/or 110) associated with a host or disk medium (e.g., host 4 or disk 10) according to logical block addresses. As illustrated in FIG. 4, LBA pointers or indications may be used to indicate LBAs of interest in a particular buffer segment 76a, which pointers may be advantageously employed by producer, consumer, and/or buffer manager components in the buffer system 86 to expeditiously determine the available contents of the buffer segments. In one implementation, five such pointers or logical block indications are maintained for each buffer segment, including a read/write indication (not shown), an initial LBA indication 150, a host LBA indication 152, and a disk LBA indication 154. A pointer 156 may also be maintained to indicate the end LBA of the segment 76a, such as the consumer pointer value 104 plus the size of the segment 76a.

The initial LBA indication 150 is indicative of a logical block address associated with the first data block in the corresponding buffer segment, for example, wherein the initial LBA indication 150 for the segment 76a in FIG. 4 represents the LBA of the first block of retained data 118. The read/write indication, the host LBA indication 152, and the disk LBA indication 154 are indicative of the data blocks in the corresponding buffer segment, for example, indicating the LBAs available to the host 4 or disk media 10 for read or write operations. As illustrated and described hereinafter, the pointers (e.g., pointers 150, 152, 154, and 156) may be maintained in a segment descriptor table (not shown) having logical block address indications indicative of logical block addresses associated with data blocks in the various segments of the buffer memory 76.

This LBA tracking technique allows any of the components of the buffer system 86 to easily ascertain the status and contents of the various buffer segments (e.g., segment 76a) without having to reconcile unrelated counter values, as was common in the prior buffer systems. In this regard, the producer and consumer components 110 and 112 may advantageously be implemented in hardware in accordance with the invention, by which firmware and other computational resources may be employed in higher level tasks, while the hardware components of the buffer system 86 implement lower level tasks. For instance, when a host command is received, hardware components can easily and quickly compare the desired LBAs from the command with the pointer values or LBA indications in a segment descriptor table, and in many cases may process the command without firmware intervention.

Figure 5:
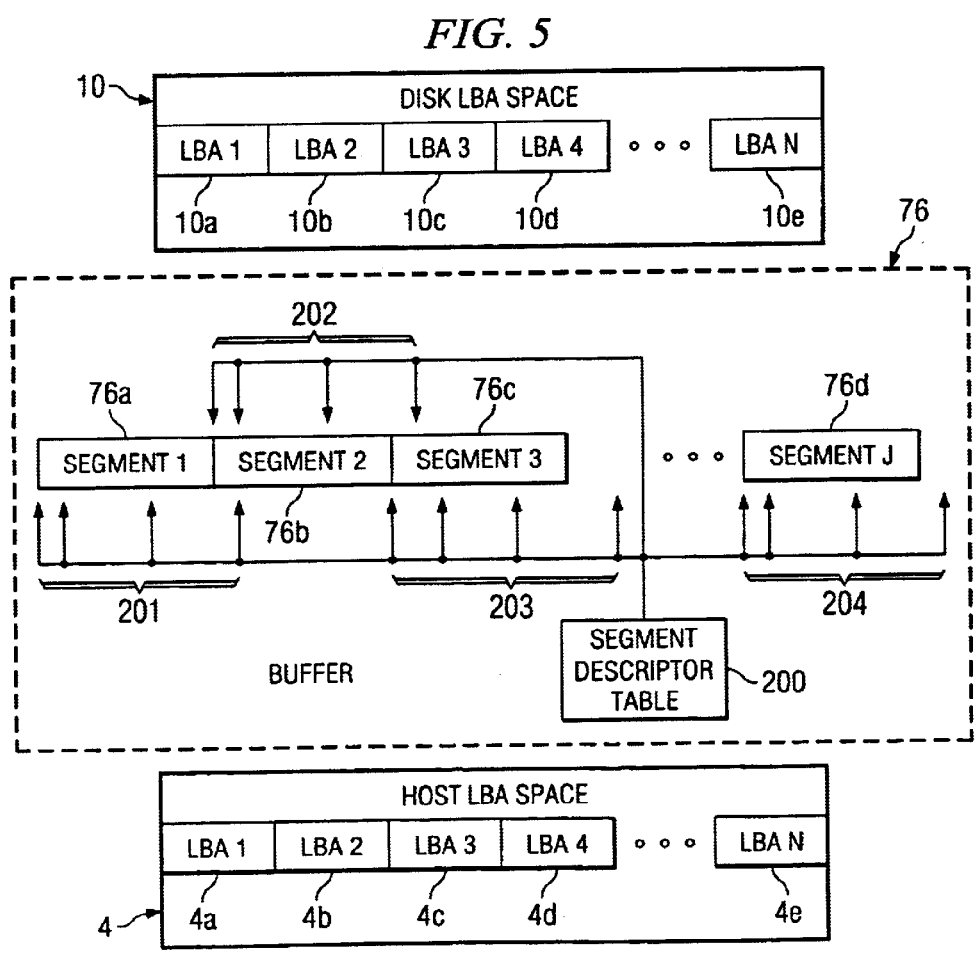
FIG. 5 is a schematic diagram illustrating an exemplary segmented buffer system in accordance with the invention, including a plurality of buffer segments and a segment descriptor table.
Figure 6A:
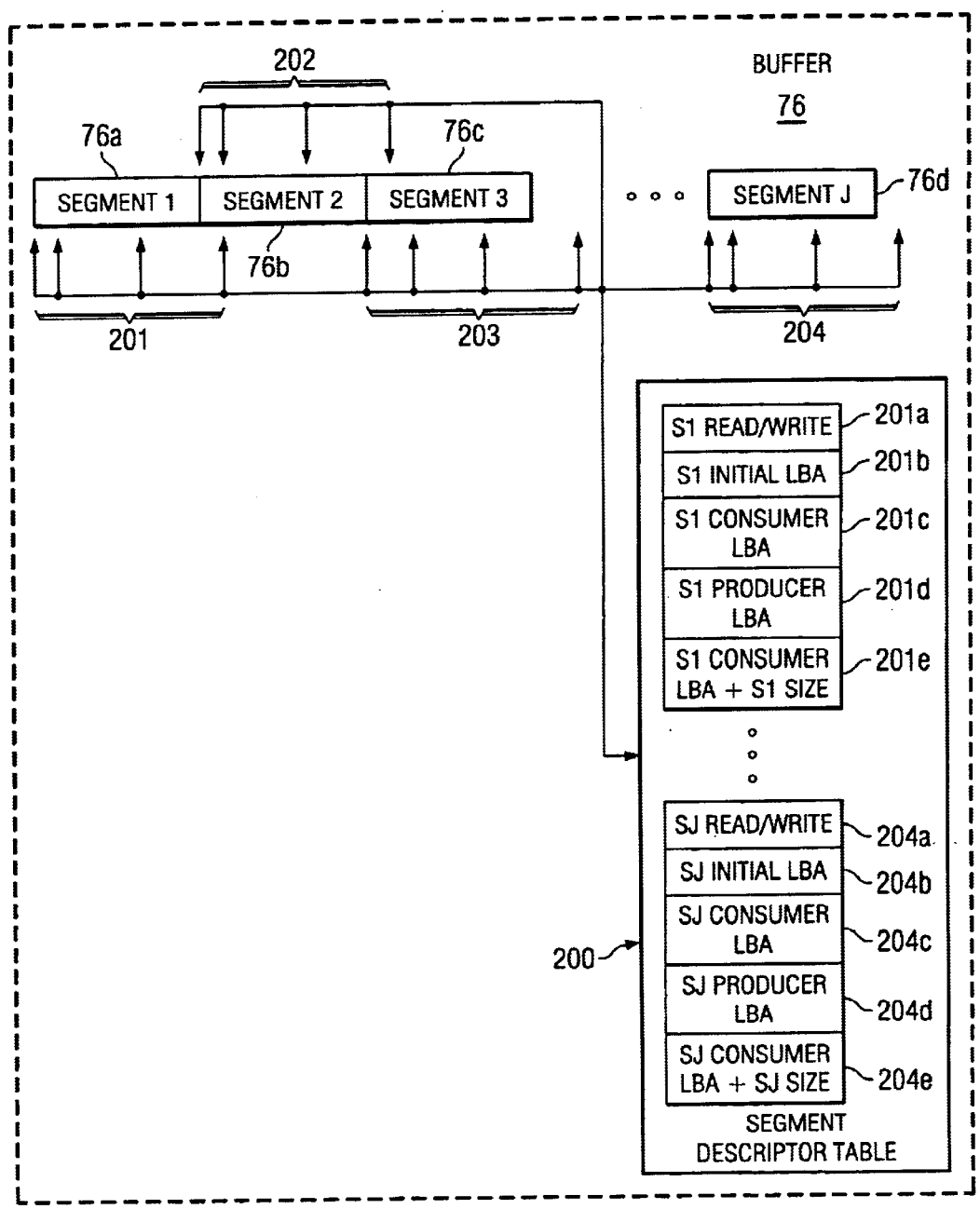
FIG. 6a is a schematic diagram illustrating further details of the exemplary segment descriptor table of FIG. 5.

Referring now to FIGS. 5 and 6a, the storage medium 10 comprises an integer number N data blocks 10a, 10b, 10c, 10d, through 10e identified by logical block addresses 1 through N (e.g., or 0 through N−1). Similarly, the host 4 comprises a host LBA space including N data blocks 4a, 4b, 4c, and 4d through 4e identified by logical block addresses 1 through N. In the implementation of FIG. 5, there is a one to one correspondence between the disk LBA space 10 and the host LBA space 4; however, it will be appreciated that other relationships are possible, for instance, wherein the host LBA space 4 is larger or smaller than the disk LBA space 10. The segmented buffer 76 comprises an integer number J buffer segments 76a through 76d, which are operative to store retrieved data blocks, using appropriate producer and consumer services, respectively, associated with the host 4 and/or the disk 10 medium. The value of J is less than N, and may be programmable by hardware and/or firmware in the buffer system 86.

LBA indications or pointers 201 through 204 are provided in a segment descriptor table 200, wherein a set of five such indications is associated with each of the corresponding buffer segments. For example, indications 201 are associated with segment 76a, indications 202 are associated with segment 76b, indications 203 are associated with segment 76c, and indications 204 are associated with segment 76d. As illustrated in FIG. 6a, a read/write indication 201a indicates whether the data blocks currently in segment 76a are the result of a read operation or a write operation, and an initial LBA indication or pointer 201b indicates the beginning LBA of the segment 76a. A consumer LBA indication 201c represents the LBA of the next data block in segment 76a to be consumed, and a producer LBA indication 201d represents the LBA of the most recently produced data block in segment 76a. The size of the segment 76a is indicated by indicator 201e, as the consumer LBA indication value 201c plus the size of the segment, so as to include virtual segment LBA space 120 (e.g., FIG. 4). Alternatively, the segment descriptor table 200 can store the segment size, from which the virtual space can be determined using the consumer LBA indication value 201c. Such indications are provided in the segment descriptor table 200 for each of the segments in the buffer 76, wherein read/write, initial LBA, consumer LBA, producer LBA, and size LBA indications 204a–204e are also illustrated in FIG. 6a corresponding to segment 76d.

In accordance with the present invention, data blocks are transferred between the host 4 and the storage medium 10 according to LBAs. The various components of the buffer system 86 may access the segment descriptor table 200 to ascertain whether data blocks of interest are located within the segmented buffer memory 76. For instance, when a host command is received from the host 4 requesting a data read from the medium 10, the LBA indicators in the command message can be directly compared with the contents of the table 200. In the illustrated implementation, this comparison can be performed quickly in hardware. If the desired LBAs are found in the table 200, the segment in which they reside can be associated with the host using one or more hardware components, such as a host consumer service circuit (not shown), which will then begin transferring (e.g., consuming) the desired data blocks from the buffer segment to the host 4, and which will update the corresponding entries in the segment descriptor table 200 according to the LBAs of data blocks consumed.

It is noted in this regard, that hardware can be employed to perform most, if not all, the functions required to service such a read request from the host 4, where a buffer segment currently holds the desired data. Furthermore, the segment selection logic in the buffer system 86 can be configured such that where desired data block LBAs from a host request are close to LBAs in the table 200 (e.g., where the corresponding data blocks have not yet been produced in the segment, but are proximate to LBAs of data therein), the segment may be selected for performing the desired transfer.

Figure 6B:
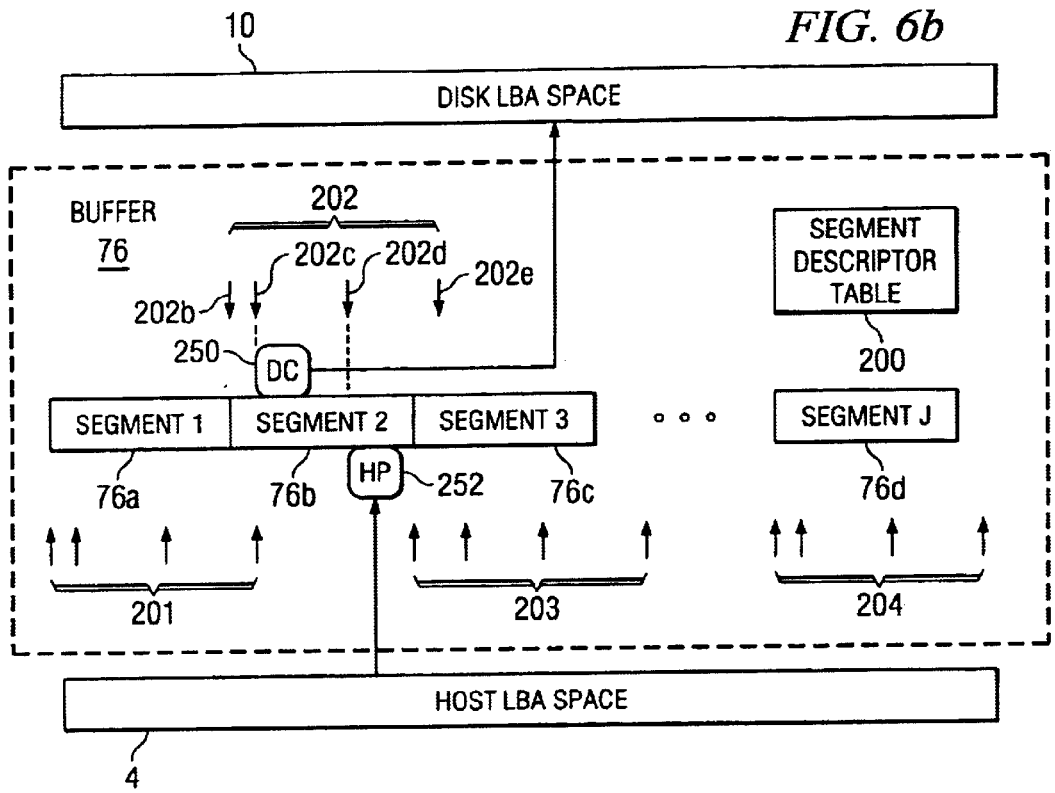
FIGS. 6b–6g are schematic diagrams illustrating operation of the exemplary segmented buffer system of FIGS. 5 and 6a in accordance with the invention.

Referring now to FIGS. 6b through 6g, when a disk write operation is desired by the host system 4, a write command is received in the buffer system 86, which is received by the buffer manager 74 (e.g., FIG. 2), and which comprises one or more logical block addresses associated with a desired data block transfer. The LBAs from the command are compared with entries in the segment descriptor table 200, such as indications 202b–202e for segment 76b. As illustrated in FIG. 6b, where some or all of the data blocks of interest are already stored in the buffer 76, such as in segment 76b, a disk consumer service component 250 is associated with the segment 76b in order to consume the data blocks therefrom, and to provide these to the disk media 10, which updates the consumer LBA indication 202c. The disk consumer component may be implemented in hardware circuitry, firmware, or combinations thereof. Where some of the blocks in question are not found in the segment 76b, a host producer component 252 is associated with the buffer segment 76b to transfer data blocks from the host 4 to the segment 76b, and to update the producer indication 202d in the table 200 accordingly.

Figure 6C:
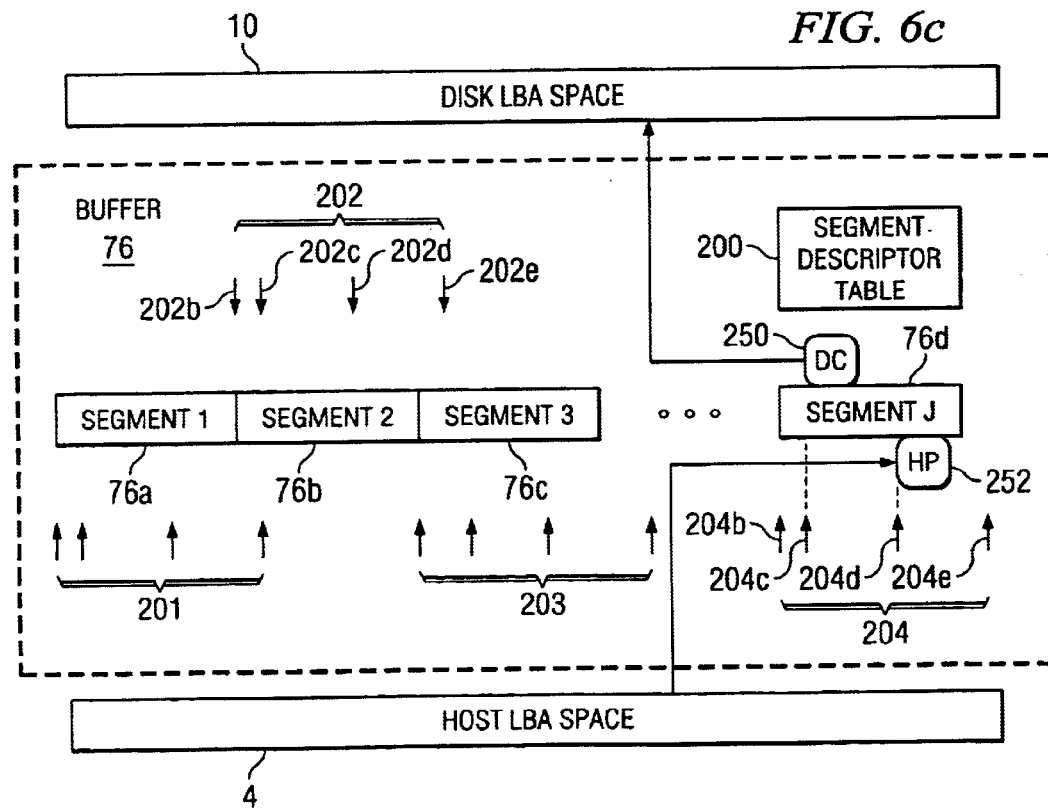
Figure 6D:
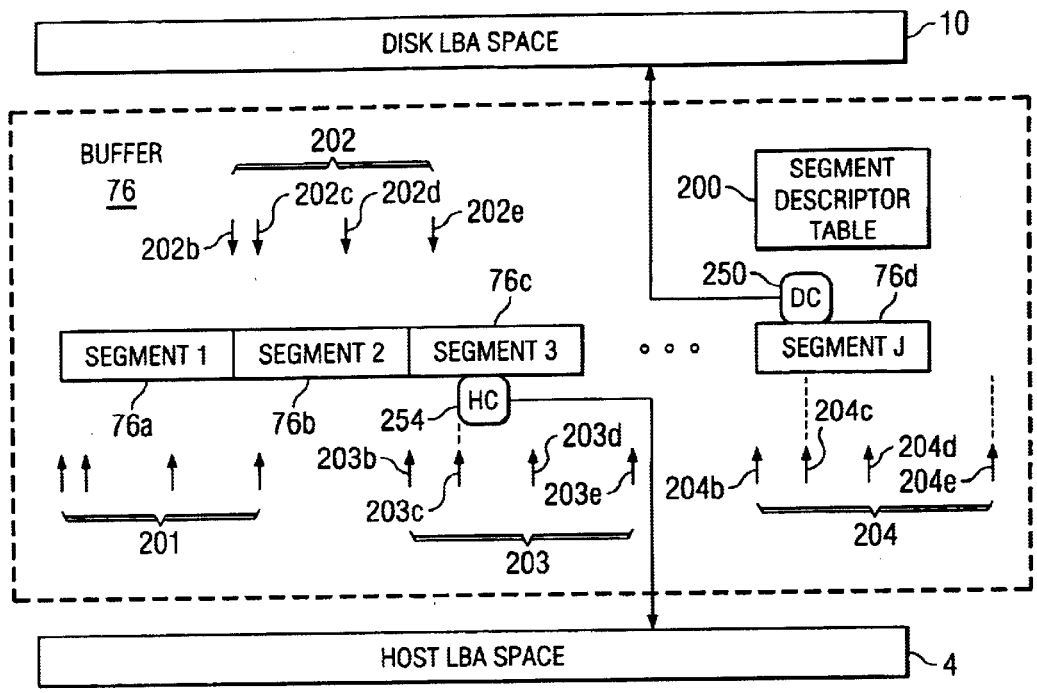

Referring now to FIG. 6c, where a subsequent data write command is received from the host 4, the disk consumer service component 250 and the host producer component 252 are associated with another buffer segment 76d. The producer 252 begins transferring blocks from the host 4 to the segment 76d and the disk consumer 250 begins transferring the desired blocks from the segment 76d to the disk medium 10. As the data transfers progress, the producer and consumer components 252 and 250 update the associated LBA indications 204d and 204c, respectively, in the segment descriptor table 200. As illustrated in FIG. 6d, a subsequent host command is received from the host system 4, this time requesting a disk read. A comparison of the read command LBAs with the LBA indications in the table 200 indicates that at least a portion of the desired data resides in buffer segment 76c. Accordingly, a host consumer service component 254 is associated with segment 76c and begins transferring blocks from the segment 76c to the host system 4, while the disk consumer 250 continues to service the prior data write command by transferring data blocks from the segment 76d and updating the consumer LBA indication 204c associated therewith.

It is noted that where a single interface exists between the host system 4 and the buffer 76, only one of the host services (e.g., host producer service 252 and host consumer service 254) are active at a time. Likewise, in many applications, only one disk medium service (consumer or producer) is present at any given time. However, as shown in FIG. 6d, a disk consumer 250 and a host consumer 254 may simultaneously operate to transfer data blocks from different segments of the buffer 76. In the situation illustrated in FIG. 6d, the disk consumer component 250 continues to transfer data blocks from the segment 76d to the disk medium 10 and updates the corresponding consumer LBA indication 204c in the table 200, while the host consumer service component 254 begins to transfer data blocks from segment 76c to the host system 4 and updates the consumer LBA indication 203c in the table 200. In this example, it is seen that the host system 4 and the disk medium 10 may be separately interfacing with separate segments in the buffer 76, by which expedited servicing of more than one host command may be performed in an efficient manner.

Figure 6E:
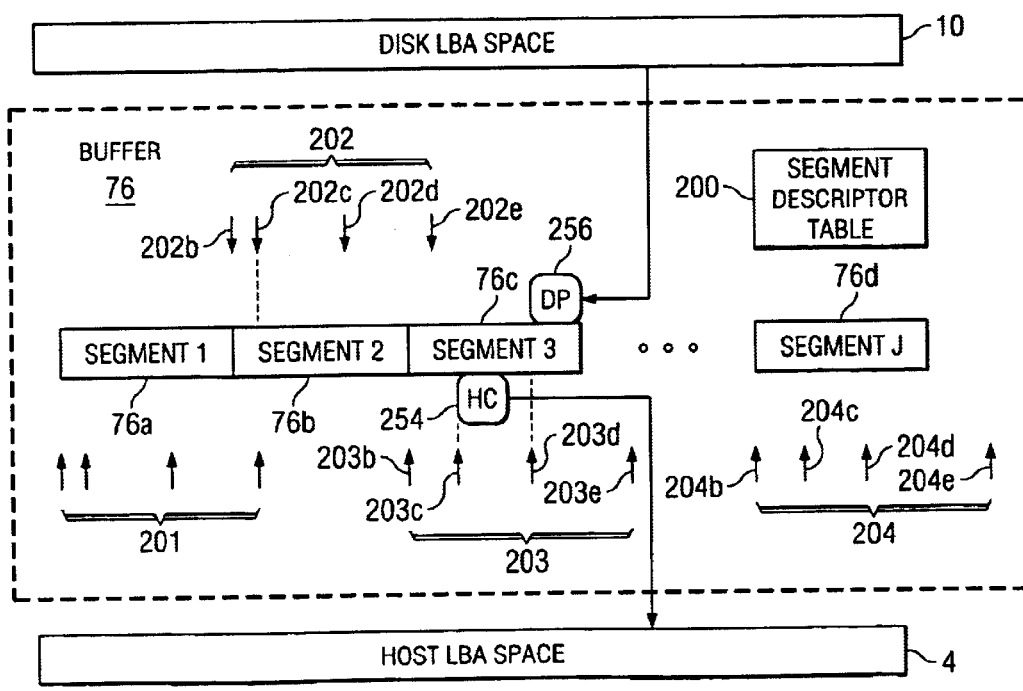
Figure 6F:
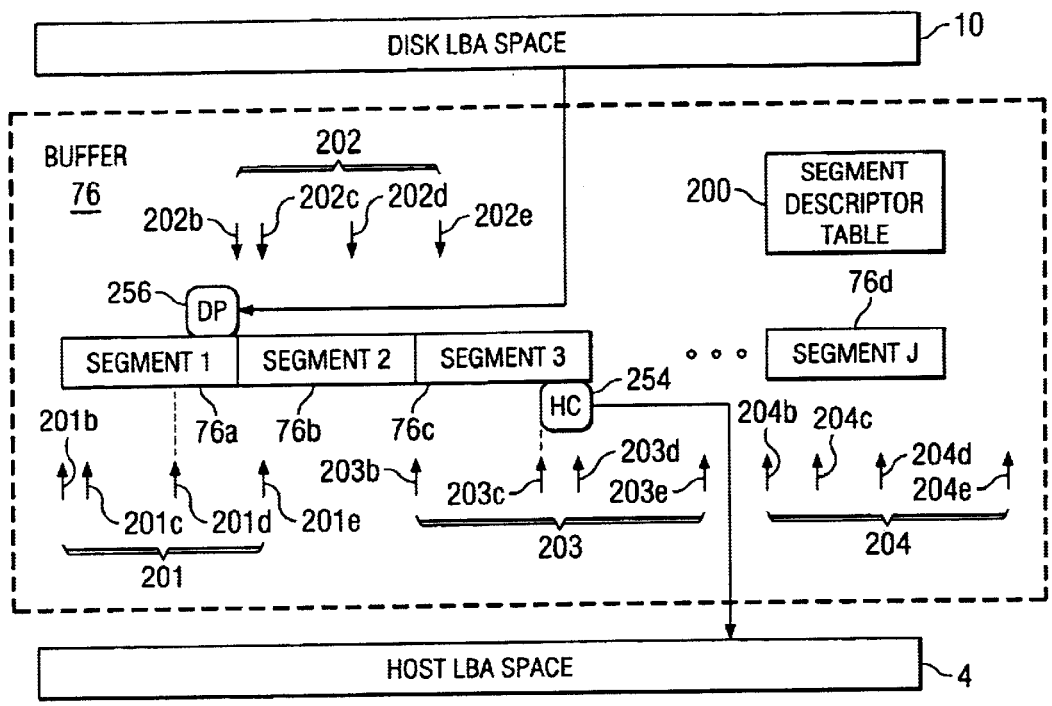
Figure 6G:
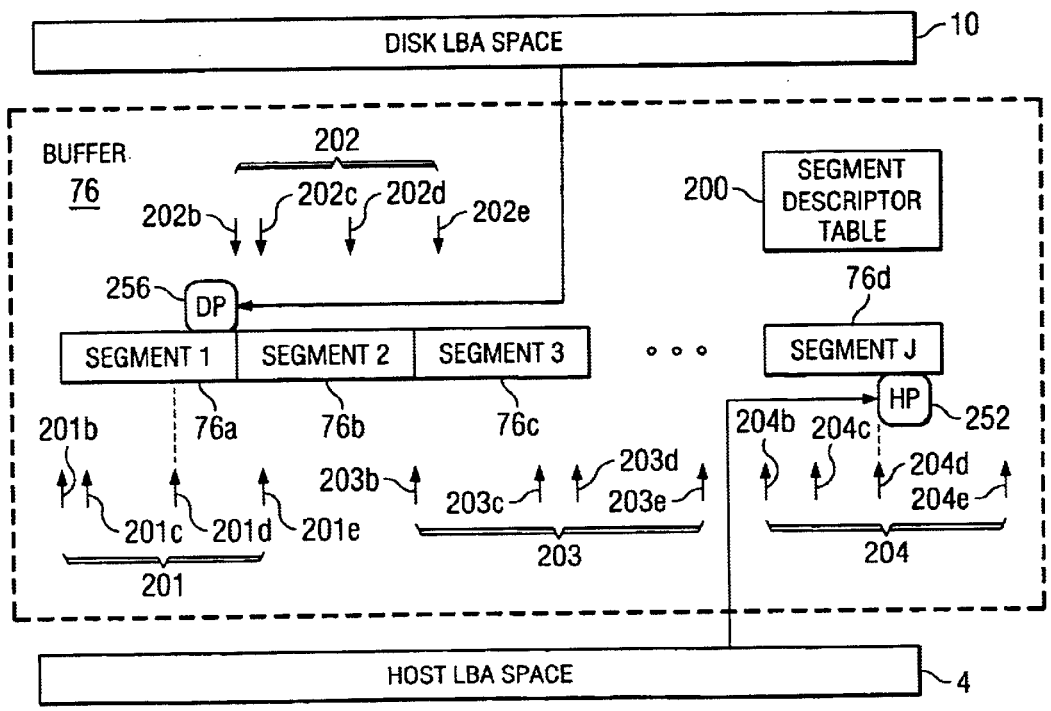

Thereafter, in order to provide all the requested data blocks for the host command, a disk producer service component 256 is associated with the segment 76c as illustrated in FIG. 6e, which operates to transfer further blocks of interest from the disk medium 10 to the segment 76c according to the LBAs in the host command. As such are obtained, the disk producer component 256 updates the corresponding producer LBA indication 203d in the table 200 for the segment 76c. As illustrated in FIG. 6f, while the host consumer 254 continues to transfer data blocks from the segment 76c and update the consumer LBA indication 203c, another host request may be received, which indicates desired LBAs for another disk read operation. Accordingly, the disk producer service component 256 is associated with buffer segment 76a, and begins transferring data blocks thereto from the disk 10, while updating the associated producer LBA indication 201d in the table 200. While the disk producer 256 proceeds with this task, a write command may be received, whereby the host producer 252 is associated with segment 76d, as illustrated in FIG. 6g.

As can be appreciated from the examples set forth in FIGS. 6b–6g, appropriate disk and host services, whether producer or consumer types, may be selectively associated with appropriate buffer segments in the buffer system 86 so as to service read and/or write commands received from the host system 4. The association of the various service components (e.g., disk consumer 250, host producer 252, host consumer 254, and/or disk producer 256) with a particular buffer segment may be accomplished in any appropriate manner, for example, wherein the buffer manager 74 (e.g., FIG. 2) provides switching logic and connections between hardware service components and the segment memory interface, according to the logical block addresses of the desired data and the LBA indication contents of the segment descriptor table 200. In this regard, any appropriate connection components may be used in implementing the present invention, including hardware, firmware controlled logic devices, or combinations thereof.

Moreover, the various components of the buffer system 86 may individually be provided access to the contents of the segment descriptor table 200. In this manner, the decisions relating to connection or association of the various service components (e.g., components 250, 252, 254, and/or 256) with individual buffer segments (e.g., segments 76a through 76e) may be made by simple comparison of desired LBAs with the LBA indications in the table 200. Thus, the invention provides significant advantages over conventional peripheral storage device buffer systems, wherein firmware was required to reconcile a variety of unrelated counter values in an attempt to ascertain what data was needed to service a host request, and whether that data was indeed available in the buffer.

Further advantages are possible within the scope of the present invention, with respect to the reliability of available data in the buffer. In this regard, prior systems provided counters indicating how many data blocks or sectors had been transferred to or from the buffer, wherein the counter values were typically offset by some amount, in order to ensure enough time for data validity verification or qualification. For instance, when reading from a disk storage medium, a counter associated with a disk FIFO was typically offset by a negative integer (e.g., −5) on the presumption that five or less data sectors would be read from the disk before error correcting code memory in the FIFO could qualify that the read data was valid (e.g., by qualifying the data and/or correcting errors therein). Thus, at any given time, the offset caused latency in the availability of data in the buffer. The present invention, on the other hand, provides up to date, real time indications in the table 200 of the current valid data in the buffer 76. For instance, once a data block is transferred into a buffer segment and qualified by a producer component, the component updates the corresponding producer LBA indication in the table. Thus, a consumer component can be independently employed to consume the qualified data almost immediately.

Figure 7:
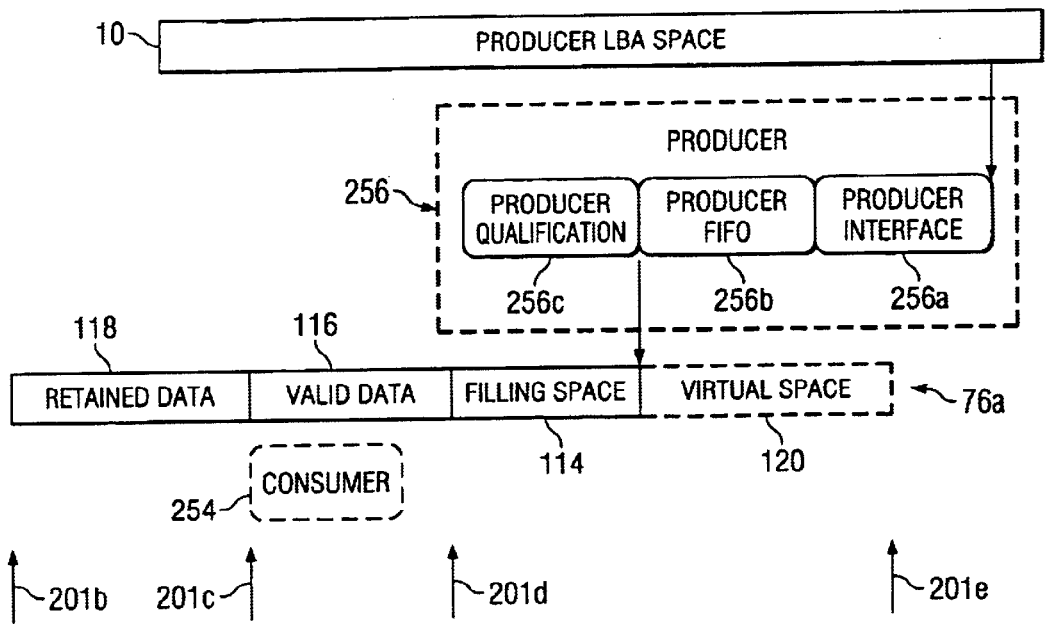
FIG. 7 is a schematic diagram illustrating details of an exemplary producer component in accordance with the invention.
Figure 8:
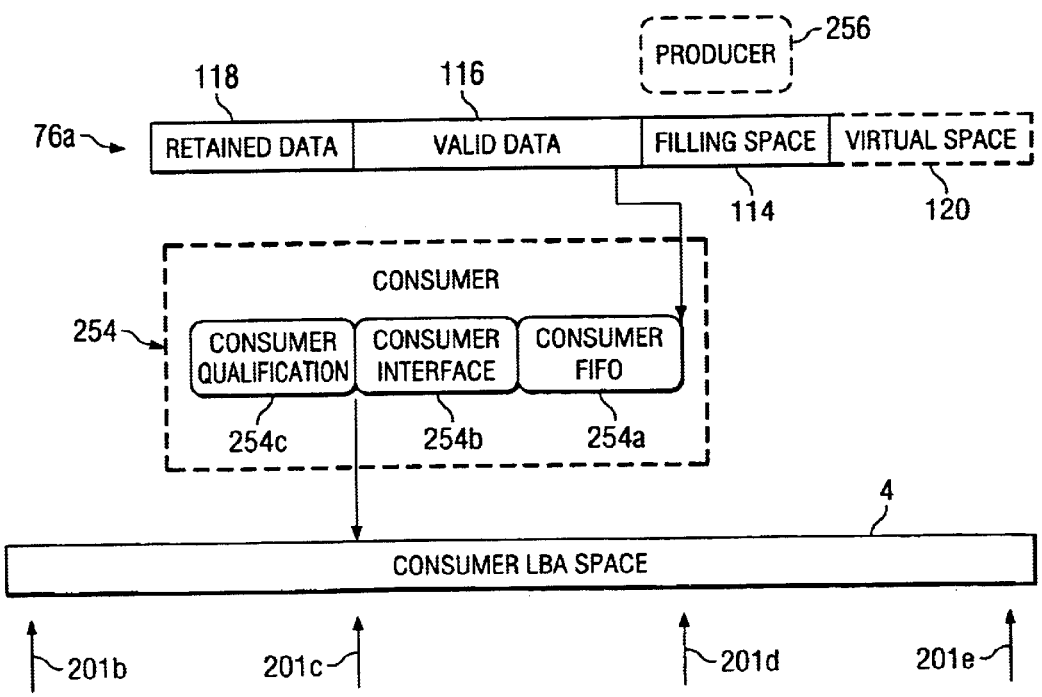
FIG. 8 is a schematic diagram illustrating details of an exemplary consumer component in accordance with the invention.
Figure 9:
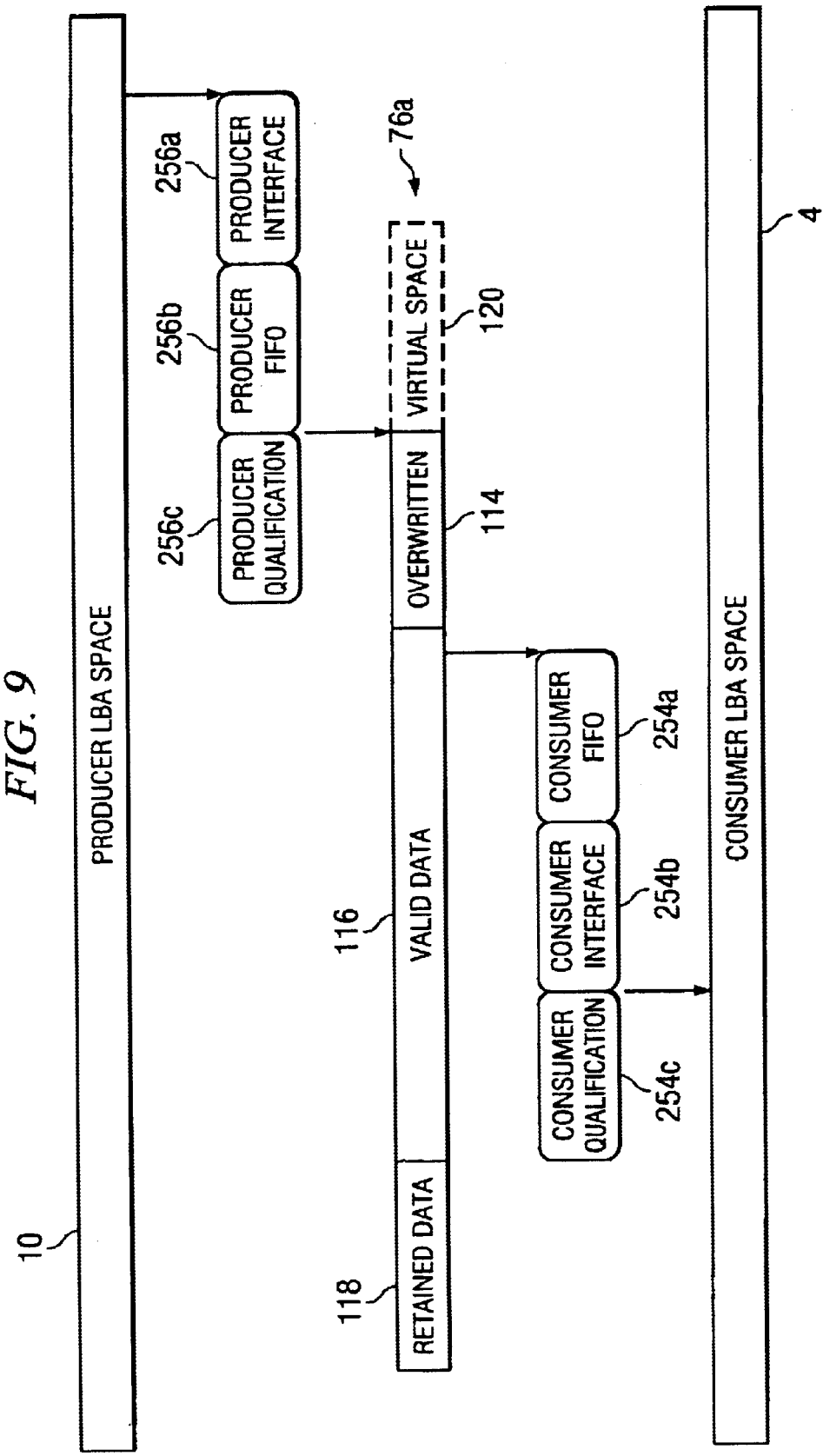
FIG. 9 is a schematic diagram illustrating the exemplary producer and consumer components of FIGS. 7 and 8, respectively, transferring data blocks between a host and a medium using a buffer segment in accordance with the invention.

Referring now to FIGS. 7–9, further details of the exemplary producer and consumer service components are illustrated, wherein the exemplary disk producer service component 256 is illustrated in FIG. 7 as operating to transfer data blocks from the disk medium 10 (e.g., producer LBA space) to the buffer segment 76a. At the illustrated point in time, the segment 76a comprises retained data 118, valid data 116, filling space 114, and virtual space 120. The initial LBA indication 201b represents the LBA of the first data block in the segment 76a (e.g., currently retained data 118), and the consumer LBA indication 201c indicates the LBA of the first block of valid data 116. The producer LBA indication 201d represents the LBA of the most recently qualified data transferred to the segment 76a. In this regard, although the producer 256 is filling the space 114 with data from the disk medium 10, the producer 256 does not update the producer LBA indication 201d until qualification is complete. Thereafter, any consumer service component (e.g., host consumer 254) can begin consuming the data from the segment 76a according to the producer LBA indication 201d, thereby being assured that any such consumed data has been qualified by the producer component 256.

According to one exemplary aspect of the invention, the producer service component 256 comprises a producer interface 256a (e.g., such as the formatter 80, FIG. 2), a producer FIFO 256b, and a producer qualification component 256c, such as an ECC memory. The interface 256a first checks for space in the segment 76a, wherein the interface transfers are checked one sector at a time. Thereafter if segment space is available, the interface component 256a moves data from the input of the formatter 80 to the FIFO 256b and tracks the LBA thereof. The producer FIFO component 256b is a first-in, first-out memory. For a host producer, no qualification component is required. However, for the disk producer component 256, the producer qualification component 256c prevents LBAs transferred during servo errors from being released to the buffer segment 76a. At the beginning of each servo field, the LBA of the current data sector is stored. After the drive firmware in the disk medium 10 has processed the servo information and determined there was no error, this LBA number is released to the segment 76a as the producer LBA indication 201d, and the table 200 is updated. However, if a servo error is detected, a check is made to see if there were any LBAs to release. If not, the error is ignored. This allows operations in the producer interface 256a (e.g., in the formatter 80) to continue across defective servo sectors. All data sectors in the wedge before and after the bad servo sector are considered defective. Qualification in the component 256c begins when an LBA has transferred from the media 10 to the FIFO 256b. It may be several sector times before that LBA has moved through the FIFO 256b and been placed into the buffer segment 76a. If the next servo field occurs before this happens, that LBA is not counted as produced.

In FIG. 8, further details of an exemplary host consumer service component 254 are illustrated, wherein the consumer 254 is shown transferring data blocks from the buffer segment 76a to the host 4 (consumer LBA space). The host consumer 254 comprises a consumer FIFO memory 254a, a consumer interface 254b interfacing the transfer to a host bus in the host system 4, and a consumer qualification component 254c. For the host consumer 254, the FIFO component 254a prefetches data from the segment 76a before being sent to the host system 4, and acts as a speed-matching buffer (e.g., such as host FIFO 64 of FIG. 2). The consumer interface component 254b moves data from the FIFO 254a to the host interface and tracks the LBA. Transfer chunk sizes can range from multiple block transfers in a programmable I/O mode (PIO) to the size of a direct memory access (DMA) command. Although qualification of consumer transfers to the host are not required, in the case of a disk consumer component (e.g., component 250 of FIG. 6b), the qualification component thereof acts in similar fashion to the disk producer qualification component 256c. FIG. 9 illustrates the interaction of a disk consumer 256 with a host consumer 254 in performing a disk read operation using buffer segment 76a.

In FIG. 10, an exemplary segment descriptor table 200 is illustrated, having columns of a read/write indications 270, base address indications 272, size indications 274, and indications for initial LBA, host LBA, disk LBA, and allowed LBA 275, 276, 277, and 278, respectively, for each segment in the buffer 76. Each segment comprises a range of consecutive LBAs. The current upper limit of the range will be increased by a producer service component portion, and a consumer service component can raise the lower limit. These processes may comprise several operations. A disk service may need to access many physical tracks of the medium 10 and a host service may execute many host commands while transferring LBAs through a given segment of the buffer 76. Each segment descriptor table row tracks the portion of a transfer operation or thread currently present in the segment. It will be appreciated that the host LBA indication in the exemplary table 200 corresponds to the consumer LBA indication illustrated and described above with respect to FIGS. 6a–6g where the current operation is a read, and to the producer LBA indication for a write operation. The converse is true of the disk LBA of the table 200 in FIG. 10, which corresponds to the consumer LBA indication illustrated and described above with respect to FIGS. 6a–6g where the current operation is a write, and to the producer LBA indication for a read operation.

Thus, it will be appreciated that hardware and/or firmware components in the buffer system 86 may easily ascertain from the entries in the table 200, the status of, and the logical block addresses of the data stored in, the various segments of the segmented buffer 76. When a host command is received a determination can thus be made as to whether the data blocks of interest (e.g., as indicated by LBAs in the host command) are part of an existing thread, or whether a new thread needs to be instantiated (e.g., using another buffer segment). Such a determination is accomplished by comparing the LBA range of the host command against the LBA ranges for each thread using the segment descriptor table 200. If no match is found, a new thread is started, for instance, wherein a buffer segment not currently being used is initialized and the appropriate producer component is connected thereto to begin "producing" data blocks to the segment. In one implementation, the least recently used buffer segment in the buffer 76 is selected for initialization where no LBA match is found. However, where a matching thread is found with a currently used buffer segment, that segment is selected for execution of the host command, and the appropriate service component(s) is associated therewith. In this regard, the comparison of command LBAs with the LBA indications in the table 200, as well as the connection or association of the various consumer and producer service components with various buffer memory segments can advantageously be performed largely or exclusively in hardware, whereby system complexity, reliability, and speed can be improved over previous buffer systems.

Another feature of the exemplary buffer system 86 comprises the allowed LBA indication (e.g., column 278 of the segment descriptor table 200 in FIG. 10), which may be provided in the segment descriptor table. The exemplary producer and consumer service components illustrated and described above, whether servicing the host system or a disk media, individually operate within the scope of a single segment, without regard to the state of other segments. This allows implementation thereof in hardware with little or no firmware overhead. However, situations may arise wherein two such segments contain the same LBAs, which in turn, may lead to data coherency problems. For instance, sectors being read from the media into a first segment which are in the range of LBAs waiting to be written from a second segment may lead to outdated LBAs being stored into the buffer.

Figure 11C:
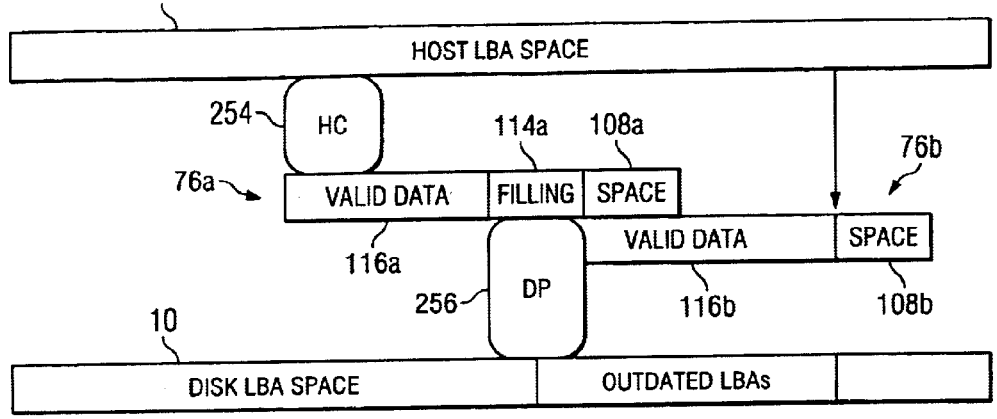

Referring now to FIGS. 11a–11c, an example of such a situation is illustrated. In FIG. 11a, a disk producer service component 256 is transferring data from a disk media 10 to a first buffer segment 76a in servicing a read operation while a host producer service component 252 writes data from the host 4 to a second segment 76b. Subsequently, the host producer component 252 completes the write operation with respect to segment 76b, and a host consumer service component 254 begins reading data blocks from the first segment 76a, while the disk producer component 256 continues to read data from the disk 10 into the segment 76a, as illustrated in FIG. 11b. However, where an overlap exists between the LBA spaces for the two segments 76a and 76b, the disk producer 256 may undesirably read LBAs from the disk media 10 which have not yet been updated with the contents of the second segment 76b. For example, in FIG. 11c, the disk producer service component 256 continues to transfer data to segment 76a until outdated LBAs are transferred from the disk 10 into the first buffer segment 76a (e.g., the updated blocks therefor having not yet been transferred to the media 10 from the second segment 76b).

In order to prevent storage of such outdated data in the buffer, the present invention further provides an allowed LBA indication (e.g., 278) in the segment descriptor table for each segment. The allowed LBA indication 278 comprises a value which system firmware may use to indicate to the hardware where a conflict with another segment may occur. Thus the firmware may selectively set the allowed LBA indication in the segment descriptor table for a first segment in response to activities associated with another segment, which the hardware may then use to avoid or mitigate storage of such outdated or invalid data to the buffer. Thus, normal operations may occur as far as the firmware has allowed for each of the segments. The consumer or producer components check the allowed LBA indication, and when the allowed LBA has been reached, such servicing may be stopped so as to avoid such situations.

Figure 11D:
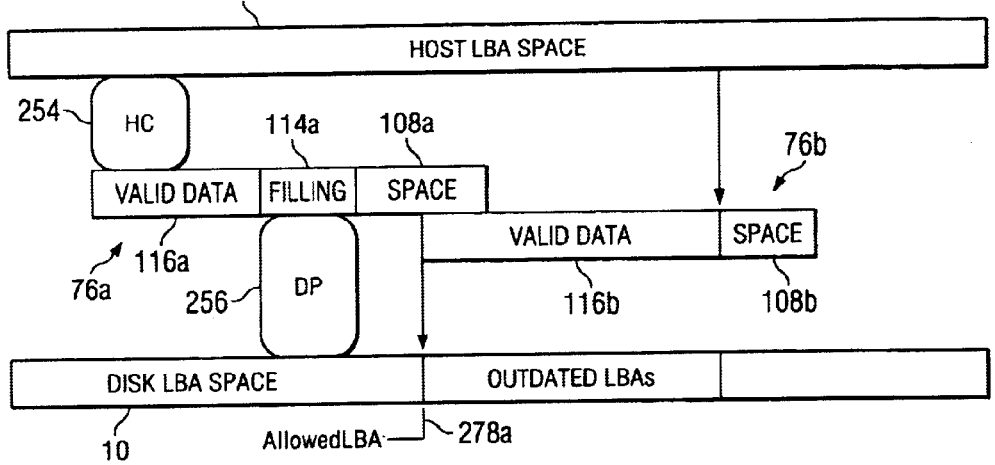
Figure 11E:
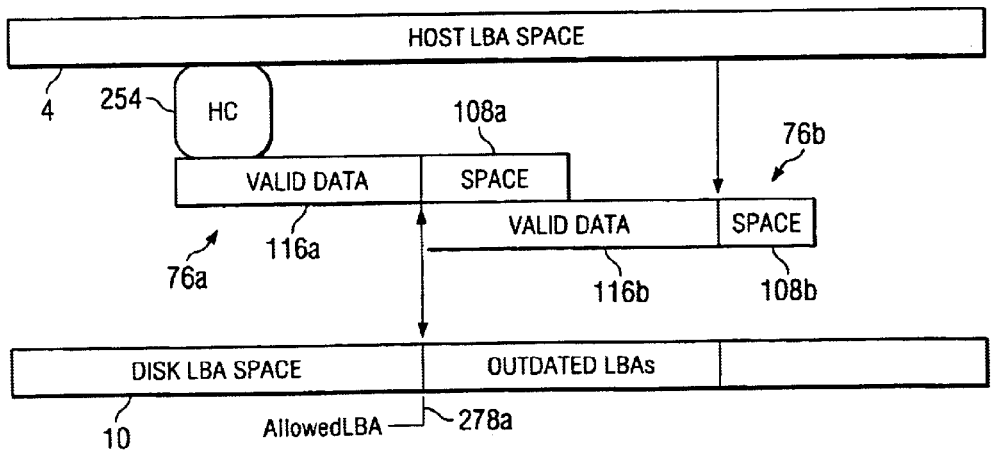
Figure 11F:
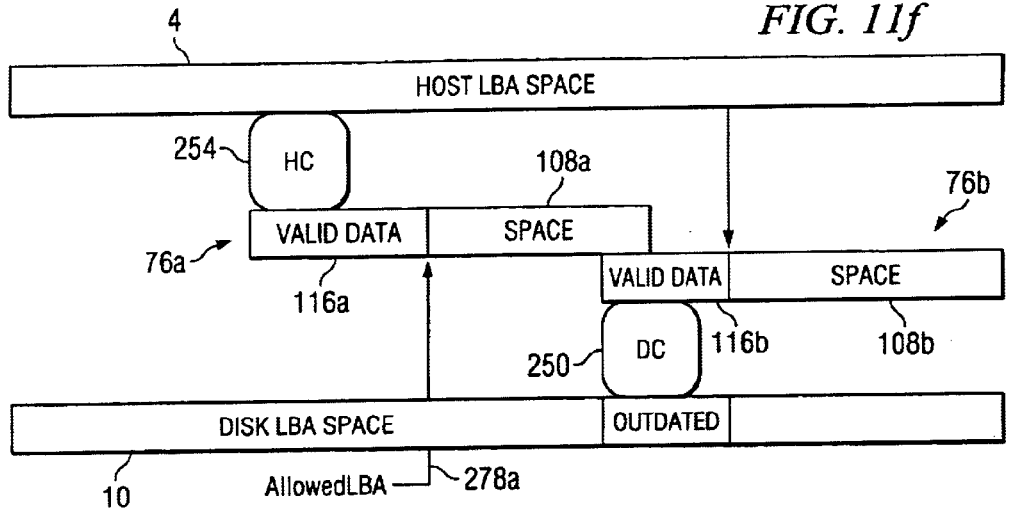
Figure 11G:
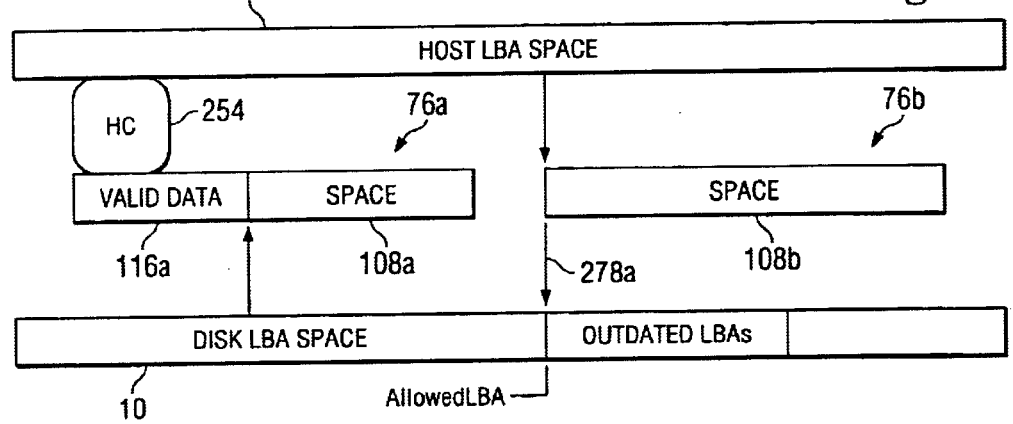
Figure 11H:
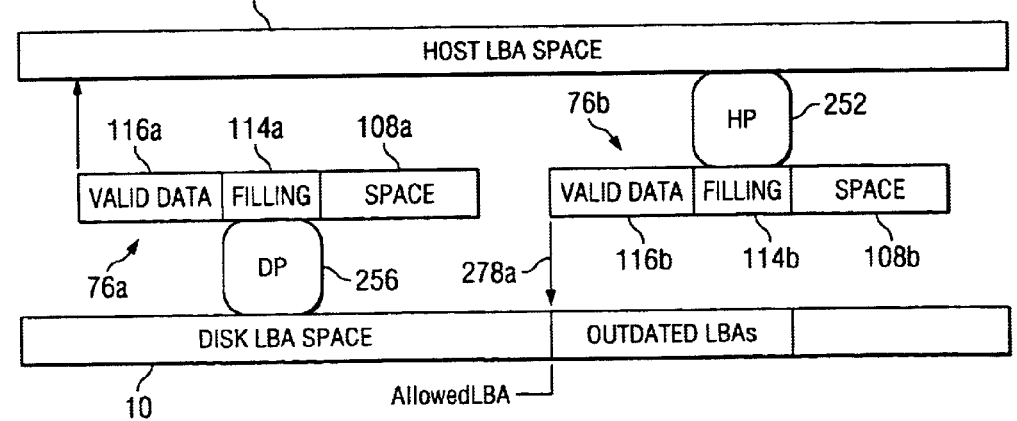

Referring now to FIGS. 11d–11h, an example of the allowed LBA and buffer operation in accordance therewith is illustrated and described hereinafter. In FIG. 11d, the disk producer component 256 is reading data from the disk 10 into the first segment 76a while a host consumer component 254 is reading data therefrom in accordance with a read operation. Firmware or other hardware components (not shown) in the buffer system 86 may provide a value for an allowed LBA indication 278a where an overlap condition occurs or is possible, such as between the segments 76a and 76b in the example. In FIG. 11d, the disk producer component 256 continues to read data blocks from the media 10 into the segment 76a in order to keep the segment 76a full. However, in accordance with another aspect of the invention, once the allowed LBA value is reached, as illustrated in FIG. 11e, the disk read operation is suspended. At this point, the disk producer service component 256 is deactivated, and a disk consumer component 250 is activated, as illustrated in FIG. 11f. In FIG. 11g, this process continues until the outdated data has been replaced with valid data in the second segment 76b through operation of the disk consumer component 250 in servicing the write operation. At this point, the firmware may update the allowed LBA indication 278a in the segment descriptor table corresponding to the first buffer segment 76a to be past the LBA at which the read operation left off. As illustrated in FIG. 11h, the disk producer component 256 may thereafter resume servicing the read operation by again transferring data from the disk media 10 into the first buffer segment 76a, and a host producer service component 252 may be associated with the second segment 76b to resume the production of data from the host 4 to the second segment 76b. Thus, the allowed LBA indication is used to prevent or minimize the likelihood of transfer of outdated data to the buffer 76, by which the consumer and producer service components may operate autonomously with respect to other segments, while operating on a given segment within the allowed LBA range thereof.

Referring now to FIGS. 12a–12d, another aspect of the invention provides methods for interfacing a host system with a storage medium, and for tracking data flow in a peripheral storage device. The methodologies involve transferring at least one data block from one of the host and the storage medium to a first buffer segment according to a logical block address, and transferring the data block from the first buffer segment to the other of the host and the storage medium according to the logical block address. An exemplary method 300 is illustrated in accordance with the present invention, and described hereinafter. Although the exemplary method 300 is illustrated and described herein as a series of acts or events, it will be appreciated that the present invention is not limited by the illustrated ordering of such acts or events, as some acts may occur in different orders and/or concurrently with other acts or events apart from those illustrated and/or described herein, in accordance with the invention. In addition, not all illustrated steps may be required to implement a methodology in accordance with the present invention. Moreover, it will be appreciated that the method 300 may be implemented in association with the apparatus and systems illustrated and described hereinabove as well as in association with other systems not illustrated.

Beginning at 302, a host command is received at 304, and a determination is made at 306 as to whether the command is a read command or a write command. In the case of a read, the method 300 proceeds to FIG. 12c as described further hereinafter. In the case of a write command, the method 300 proceeds to 308, where the host command LBAs are compared with the entries in a segment description table. If there is no match at 310, the method 300 proceeds to FIG. 12b. However, if there is a match at 310, a disk consumer service component is attached to the buffer segment associated with the matching table entries at 312. Data blocks are then transferred from the buffer segment to the disk medium at 314, and the corresponding segment description table entries are updated at 316, whereafter the method returns at 318.

Figure 12A:
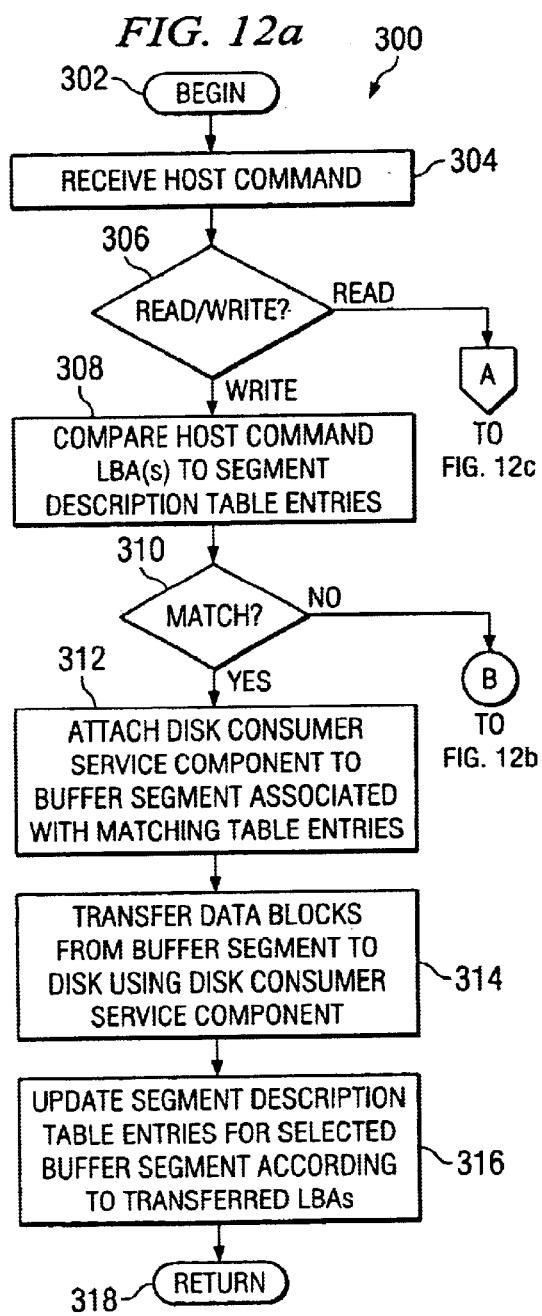
Figure 12B:
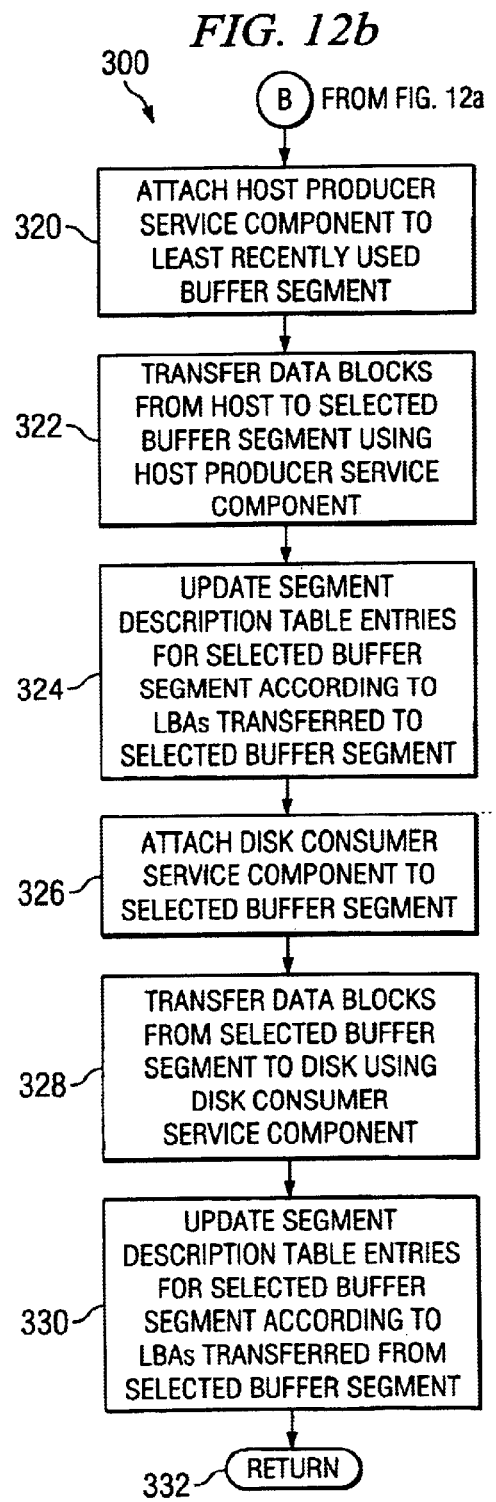

In the case of a write operation, where there is no match found at 310, the method proceeds to 320 of FIG. 12b, where a host producer service component is attached to a segment, such as the least recently used segment in the buffer. Data blocks are then transferred at 322 from the host to the selected buffer segment using the host producer service component, and the corresponding segment descriptor table entries are updated at 324. A disk consumer service component is attached to the selected buffer segment at 326. Data blocks are then transferred from the buffer segment to the disk medium at 328, and the corresponding segment description table entries are updated at 330, whereafter the method returns at 332.

Referring also to FIGS. 12c and 12d, where the host command was determined to be a read command at 306 (FIG. 12a), the method 300 proceeds to 340 in FIG. 12c, where the host command LBAs are compared to the segment descriptor table entries. If no match is found at 342, the method 300 proceeds to FIG. 12d, as described below. However, if there is a match at 342, a host consumer service component is attached to the buffer segment associated with the matching table entries at 344. Data blocks are then transferred from the buffer segment to the host at 346, and the corresponding segment description table entries are updated at 348, whereafter the method returns at 350. Where there is no match found at 342, the method proceeds to 360 of FIG. 12d, where a disk producer service component is attached to a segment, such as the least recently used segment in the buffer. Data blocks are then transferred at 362 from the disk to the selected buffer segment using the disk producer service component, and the corresponding segment descriptor table entries are updated at 364. A host consumer service component is attached to the selected buffer segment at 366. Data blocks are then transferred from the buffer segment to the host at 368, and the corresponding segment description table entries are updated at 370, whereafter the method returns at 372.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description and the claims, such terms are intended to be inclusive in a manner similar to the term "comprising."

What is claimed is:

1. A method of interfacing a storage medium with a host using a segmented buffer having a plurality of buffer segments to transfer data blocks between the host and the storage medium, the method comprising:

transferring at least one data block from the host and the storage medium to a first buffer segment in the segmented buffer according to a logical block address associated with the at least one data block; and transferring the at least one data block from the first buffer segment to the host and the storage medium according to the same logical block address.

2. The method of claim 1, further comprising providing logical block address indications in a segment descriptor table, wherein the logical block address indications are indicative of data block contents of the plurality of buffer segments.

3. The method of claim 2, further comprising:

receiving a command from the host, wherein the command comprises at least one command logical block address indication associated with a desired data block transfer;

performing a comparison of the at least one command logical block address indication from the command with the logical block address indications in the segment descriptor table; and selecting a buffer segment for the desired data block transfer from the plurality of buffer segments according to the comparison.

4. The method of claim 3, wherein performing the comparison comprises determining whether the at least one command logical block address indication matches any of the logical block address indications in the segment descriptor table, and wherein selecting the buffer segment comprises using a buffer segment whose corresponding logical block address indications in the segment descriptor table matches the at least one command logical block address indication for the desired data block transfer if a match is found.

5. The method of claim 3, wherein the command from the host comprises a read command and the at least one command logical block address indication is indicative of data blocks to be transferred to the host, wherein selecting the buffer segment comprises selecting the first buffer segment if the logical block address indications in the segment descriptor table corresponding to the first buffer segment match the at least one command logical block address indication, and wherein transferring the at least one data block from the first buffer segment comprises transferring the at least one data block from the first buffer segment to the host according to the at least one command logical block address indication and updating the segment descriptor table according to the transfer of the at least one data block if the logical block address indications in the segment descriptor table corresponding to the first buffer segment match the at least one command logical block address indication.

6. The method of claim 5, wherein selecting the buffer segment comprises selecting the first buffer segment if no logical block address indications in the segment descriptor table match the at least one command logical block address indication, wherein transferring at least one data block from a first one of the host and the storage medium to the first buffer segment comprises transferring at least one data block from the storage medium to the first buffer segment according to the at least one command logical block address indication and updating segment descriptor table if no logical block address indications in the segment descriptor table match the at least one command logical block address indication, and wherein transferring the at least one data block from the first buffer segment to a second one of the host and the storage medium according to the logical block address comprises transferring the at least one data block from the first buffer segment to the host and updating the segment descriptor table if no logical block address indications in the segment descriptor table match the at least one command logical block address indication.

7. The method of claim 3, wherein the command from the host comprises a write command and the at least one command logical block address indication is indicative of data blocks to be transferred to the storage medium, wherein selecting a buffer segment comprises selecting the first buffer segment if the logical block address indications in the segment descriptor table corresponding to the first buffer segment match the at least one command logical block address indication, and wherein transferring the at least one data block from the first buffer segment comprises transferring the at least one data block from the first buffer segment to the storage medium according to the at least one command logical block address indication and updating the segment descriptor table according to the transfer of the at least one data block if the logical block address indications in the segment descriptor table corresponding to the first buffer segment match the at least one command logical block address indication.

8. The method of claim 7, wherein selecting a buffer segment comprises selecting the first buffer segment if no logical block address indications in the segment descriptor table match the at least one command logical block address indication, wherein transferring at least one data block from a first one of the host and the storage medium to the first buffer segment comprises transferring at least one data block from the host to the first buffer segment according to the at least one command logical block address indication and updating segment descriptor table if no logical block address indications in the segment descriptor table match the at least one command logical block address indication, and wherein transferring the at least one data block from the first buffer segment to a second one of the host and the storage medium according to the logical block address comprises transferring the at least one data block from the first buffer segment to the storage medium and updating the segment descriptor table if no logical block address indications in the segment descriptor table match the at least one command logical block address indication.

9. The method of claim 2, wherein transferring the at least one data block from the first one of the host and the storage medium to the first buffer segment comprises updating the logical block address indications in the segment descriptor table, and wherein transferring the at least one data block from the first buffer segment to the second one of the host and the storage medium comprises updating the logical block address indications in the segment descriptor table.

10. The method of claim 9, wherein providing logical block address indications in the segment descriptor table comprises providing a read/write indication, an initial LBA indication, a host LBA indication, and a disk LBA indication for each of the plurality of buffer segments, wherein the initial LBA indication is indicative of a logical block address associated with a first data block in the corresponding buffer segment, wherein the read/write indication, the host LBA indication, and the disk LBA indication are indicative of the data blocks in the corresponding buffer segment, and wherein updating the logical block address indications in the segment descriptor table comprises updating one of the host LBA indication and the disk LBA indication according to the logical block address of the data block being transferred to or from the corresponding buffer segment.

11. The method of claim 2, wherein providing logical block address indications in the segment descriptor table comprises providing a read/write indication, an initial LBA indication, a host LBA indication, and a disk LBA indication for each of the plurality of buffer segments, wherein the initial LBA indication is indicative of a logical block address associated with a first data block in a corresponding buffer segment, and wherein the read/write indication, the host LBA indication, and the disk LBA indication are indicative of the data blocks in the corresponding buffer segment.

12. A method of tracking dataflow in a peripheral storage device interfacing with a host system to transfer data blocks between the host system and a storage medium using a segmented buffer, the method comprising:
providing logical block address indications indicative of data block contents of a plurality of buffer segments in the segmented buffer; and
transferring data blocks between the host system and the storage medium using at least one buffer segment according to logical block address indications associated with the at least one buffer segment.

13. The method of claim 12, wherein transferring data blocks between the host system and the storage medium comprises:
receiving a command from the host, wherein the command comprises at least one command logical block address indication associated with a desired data block transfer;
performing a comparison of the at least one command logical block address indication from the command with the logical block address indications in the segment descriptor table; and
selecting a buffer segment for the desired data block transfer from the plurality of buffer segments according to the comparison.

14. The method of claim 13, wherein providing logical block address indications comprises providing a read/write indication, an initial LBA indication, a host LBA indication, and a disk LBA indication in a segment descriptor table for each of the plurality of buffer segments, wherein the initial LBA indication is indicative of a logical block address associated with a first data block in a corresponding buffer segment, and wherein the read/write indication, the host LBA indication, and the disk LBA indication are indicative of the data blocks in the corresponding buffer segment.

15. The method of claim 12, wherein providing logical block address indications comprises providing a read/write indication, an initial LBA indication, a host LBA indication, and a disk LBA indication in a segment descriptor table for each of the plurality of buffer segments, wherein the initial LBA indication is indicative of a logical block address associated with a first data block in a corresponding buffer segment, and wherein the read/write indication, the host LBA indication, and the disk LBA indication are indicative of the data blocks in the corresponding buffer segment.

16. A peripheral storage device buffer system for interfacing a host with a storage medium to transfer data blocks therebetween, the buffer system comprising:
a buffer memory comprising a plurality of buffer segments operative to store or retrieve data blocks;
a host service component operatively associated with the buffer memory and the host to transfer data blocks therebetween according to logical block addresses; and
a storage medium service component operatively associated with the buffer memory and the storage medium to transfer data blocks therebetween according to same logical block addresses.

17. The buffer system of claim 16, wherein the buffer memory comprises a buffer manager component operative to receive a host command, wherein the host command comprises at least one logical block address associated with a desired data block transfer.

18. The buffer system of claim 17, further comprising a segment description table having logical block address indications indicative of logical block addresses associated with data blocks in the plurality of buffer segments.

19. The buffer system of claim 18, wherein the logical block address indications comprise a read/write indication, an initial LBA indication, a host LBA indication, and a disk LBA indication for each of the plurality of buffer segments, wherein the initial LBA indication is indicative of a logical block address associated with a first data block in a corresponding buffer segment, and wherein the read/write indication, the host LBA indication, and the disk LBA indication are indicative of the data blocks in the corresponding buffer segment.

20. The buffer system of claim 16, further comprising a segment description table having logical block address indications indicative of logical block addresses associated with data blocks in the plurality of buffer segments.

21. The buffer system of claim 20, wherein the logical block address indications comprise a read/write indication, an initial LBA indication, a host LBA indication, and a disk LBA indication for each of the plurality of buffer segments, wherein the initial LBA indication is indicative of a logical block address associated with a first data block in a corresponding buffer segment, and wherein the read/write indication, the host LBA indication, and the disk LBA indication are indicative of the data blocks in the corresponding buffer segment.

22. The buffer system of claim 20, wherein the host service component is operative to selectively transfer data blocks between a first buffer segment in the buffer memory and the host according to logical block address indications in the segment description table and at least one logical block address associated with a desired data block transfer.

23. The buffer system of claim 22, wherein the host service component is operative to update the logical block address indications associated with the first buffer segment in the segment description table according to logical block addresses associated with data blocks transferred between the first buffer segment in the buffer memory and the host.

24. The buffer system of claim 22, wherein the buffer memory comprises a buffer manager component operative to receive a host command, wherein the host command comprises the at least one logical block address associated with a desired data block transfer, and wherein buffer manager component is operative to select the first buffer segment according to logical block address indications associated with the first buffer segment in the segment description table and the at least one logical block address from the host command.

25. The buffer system of claim 20, wherein the storage medium service component is operative to selectively transfer data blocks between a first buffer segment in the buffer memory and the storage medium according to logical block address indications in the segment description table and at least one logical block address associated with a desired data block transfer.

26. The buffer system of claim 25, wherein the storage medium service component is operative to update the logical block address indications associated with the first buffer segment in the segment description table according to logical block addresses associated with data blocks transferred between the first buffer segment in the buffer memory and the storage medium.

27. The buffer system of claim 25, wherein the buffer memory comprises a buffer manager component operative to receive a host command, wherein the host command comprises the at least one logical block address associated with a desired data block transfer, and wherein buffer manager component is operative to select the first buffer segment according to logical block address indications associated with the first buffer segment in the segment description table and the at least one logical block address from the host command.

28. The buffer system of claim 16, wherein the host service component comprises a producer component having a producer qualification component, a producer FIFO and a producer interface component, and wherein the storage medium service component comprises a consumer component having a consumer qualification component, a consumer FIFO, and a consumer interface component.

29. The buffer system of claim 16, wherein the storage medium service component comprises a producer component having a producer qualification component, a producer FIFO and a producer interface component, and wherein the host service component comprises a consumer component having a consumer qualification component, a consumer FIFO, and a consumer interface component.

30. A peripheral storage device buffer system for interfacing a host with a storage medium to transfer data blocks therebetween, the buffer system comprising:
 a buffer memory comprising a plurality of buffer segments operative to store or retrieve data blocks;
 a host service component operatively associated with the buffer memory and the host to transfer data blocks therebetween according to logical block addresses; and
 a storage medium service component operatively associated with the buffer memory and the storage medium to transfer data blocks therebetween according to logical block addresses,
 wherein the host service component comprises a producer component having a producer qualification component, a producer FIFO and a producer interface component, and wherein the storage medium service component comprises a consumer component having a consumer qualification component, a consumer FIFO, and a consumer interface component, and
 wherein the host service component is operative to selectively transfer data blocks between a first buffer segment in the buffer memory and the host according to logical block address indications in the segment description table and at least one logical block address associated with a desired data block transfer, and wherein the producer qualification component is operative to update the logical block address indications associated with the first buffer segment in the segment description table according to logical block addresses associated with data blocks transferred between the first buffer segment in the buffer memory and the host.

31. A peripheral storage device buffer system for interfacing a host with a storage medium to transfer data blocks therebetween, the buffer system comprising:
 a buffer memory comprising a plurality of buffer segments operative to store or retrieve data blocks;
 a host service component operatively associated with the buffer memory and the host to transfer data blocks therebetween according to logical block addresses; and
 a storage medium service component operatively associated with the buffer memory and the storage medium to transfer data blocks therebetween according to logical block addresses,
 wherein the host service component comprises a producer component having a producer qualification component, a producer FIFO and a producer interface component, and wherein the storage medium service component comprises a consumer component having a consumer qualification component, a consumer FIFO, and a consumer interface component, and
 wherein the storage medium service component is operative to selectively transfer data blocks between a first buffer segment in the buffer memory and the storage medium according to logical block address indications in the segment description table and at least one logical block address associated with a desired data block transfer, and wherein the consumer qualification component is operative to update the logical block address indications associated with the first buffer segment in the segment description table according to logical block addresses associated with data blocks transferred between the first buffer segment in the buffer memory and the storage medium.

32. A peripheral storage device buffer system for interfacing a host with a storage medium to transfer data blocks therebetween, the buffer system comprising:
 a buffer memory comprising a plurality of buffer segments operative to store or retrieve data blocks;
 a host service component operatively associated with the buffer memory and the host to transfer data blocks therebetween according to logical block addresses; and
 a storage medium service component operatively associated with the buffer memory and the storage medium to transfer data blocks therebetween according to logical block addresses,
 wherein the storage medium service component comprises a producer component having a producer qualification component, a producer FIFO and a producer interface component, and wherein the host service component comprises a consumer component having a consumer qualification component, a consumer FIFO, and a consumer interface component, and
 wherein the storage medium service component is operative to selectively transfer data blocks between a first buffer segment in the buffer memory and the storage medium according to logical block address indications in the segment description table and at least one logical block address associated with a desired data block transfer, and wherein the producer qualification component is operative to update the logical block address indications associated with the first buffer segment in the segment description table according to logical block addresses associated with data blocks transferred between the first buffer segment in the buffer memory and the storage medium.

33. A peripheral storage device buffer system for interfacing a host with a storage medium to transfer data blocks therebetween, the buffer system comprising:

- a buffer memory comprising a plurality of buffer segments operative to store or retrieve data blocks;
- a host service component operatively associated with the buffer memory and the host to transfer data blocks therebetween according to logical block addresses; and
- a storage medium service component operatively associated with the buffer memory and the storage medium to transfer data blocks therebetween according to logical block addresses,
- wherein the storage medium service component comprises a producer component having a producer qualification component, a producer FIFO and a producer interface component, and wherein the host service component comprises a consumer component having a consumer qualification component, a consumer FIFO, and a consumer interface component, and
- wherein the host service component is operative to selectively transfer data blocks between a first buffer segment in the buffer memory and the host according to logical block address indications in the segment description table and at least one logical block address associated with a desired data block transfer, and wherein the consumer qualification component is operative to update the logical block address indications associated with the first buffer segment in the segment description table according to logical block addresses associated with data blocks transferred between the first buffer segment in the buffer memory and the host.

* * * * *